(12) United States Patent
Liang et al.

(10) Patent No.: US 12,712,229 B2
(45) Date of Patent: Aug. 18, 2026

(54) BOX, BATTERY, ELECTRICAL DEVICE AND METHOD FOR MANUFACTURING BATTERY

(71) Applicant: JIANGSU CONTEMPORARY AMPEREX TECHNOLOGY LIMITED, Changzhou (CN)

(72) Inventors: Chengdu Liang, Changzhou (CN); Zhiming Chen, Changzhou (CN); Jian Pan, Changzhou (CN); Hui Yang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 663 days.

(21) Appl. No.: 18/316,235

(22) Filed: May 12, 2023

(65) Prior Publication Data

US 2023/0282918 A1 Sep. 7, 2023

Related U.S. Application Data

(63) Continuation of application No. PCT/CN2020/128861, filed on Nov. 13, 2020.

(51) Int. Cl.
*H01M 50/24* (2021.01)
*H01M 50/209* (2021.01)
(Continued)

(52) U.S. Cl.
CPC ......... *H01M 50/24* (2021.01); *H01M 50/209* (2021.01); *H01M 50/249* (2021.01);
(Continued)

(58) Field of Classification Search
None
See application file for complete search history.

(56) References Cited

FOREIGN PATENT DOCUMENTS

CN 104091904 A 10/2014
CN 107579180 A 1/2018
(Continued)

OTHER PUBLICATIONS

Cao et al, CN 109585715 A, English Translation from FIT, 12 pages (Year: 2019).*

(Continued)

*Primary Examiner* — Colin W. Slifka
(74) *Attorney, Agent, or Firm* — K&L Gates LLP

(57) ABSTRACT

Provided are a box, a battery, an electrical device, and a method for manufacturing the battery, which belong to the technical field of energy storage devices. The box is applicable to a battery, the battery includes a battery cell, in which the box includes a plurality of box walls, in which the plurality of box walls enclose a first chamber for accommodating the battery cell, and at least one of the box walls is internally provided with a second chamber for accommodating fire-fighting agent, in which the first chamber and the second chamber are configured to be able to communicate with each other when the battery cell is thermal-runaway, so that the fire-fighting agent releases fire-fighting medium into the first chamber. The box, the battery, the electrical device and the method for manufacturing the battery can improve the safety performance of the battery.

20 Claims, 10 Drawing Sheets

(51) Int. Cl.

| | |
|---|---|
| ***H01M 50/249*** | (2021.01) |
| ***H01M 50/317*** | (2021.01) |
| ***H01M 50/342*** | (2021.01) |
| ***H01M 50/375*** | (2021.01) |
| ***H01M 50/383*** | (2021.01) |

(52) U.S. Cl.

CPC ..... *H01M 50/317* (2021.01); *H01M 50/3425* (2021.01); *H01M 50/375* (2021.01); *H01M 50/383* (2021.01); *H01M 2220/20* (2013.01)

(56) References Cited

FOREIGN PATENT DOCUMENTS

| | | | |
|---|---|---|---|
| CN | 207353319 | U | 5/2018 |
| CN | 207474569 | U | 6/2018 |
| CN | 109585715 | A | 4/2019 |
| CN | 109687045 | A | 4/2019 |
| CN | 110600638 | A | 12/2019 |
| CN | 210296467 | U | 4/2020 |
| CN | 111584792 | A | 8/2020 |
| DE | 102019111787 | A1 | 11/2020 |
| JP | 2000030739 | A | 1/2000 |
| JP | 2014502000 | A | 1/2014 |
| JP | 2014506384 | A | 3/2014 |
| JP | 2014531231 | A | 11/2014 |
| JP | 2020123540 | A | 8/2020 |
| KR | 101866686 | B1 | 6/2018 |
| KR | 20180113809 | A | 10/2018 |
| KR | 20200120194 | A | 10/2020 |
| KR | 20200125884 | A | 11/2020 |
| WO | 2017213132 | A1 | 12/2017 |

OTHER PUBLICATIONS

Zhang et al, CN 110600638, English Translation from FIT, 12 pages (Year: 2019).*

Decision to Grant a Patent received in the corresponding Japanese Application 2022-551320, mailed on Jul. 23, 2024.

The Notice of First Examination Opinion received in the corresponding European Application 20961217.5, mailed on Oct. 4, 2024.

The Request for the Submission of an Opinion received in the corresponding Korean Application 10-2022-7030207, mailed on Sep. 23, 2024.

The Written Opinion received in the corresponding International Application PCT/CN2020/128861, mailed Apr. 29, 2021.

The extended European search report received in the corresponding European application 20961217.5, mailed Jun. 2, 2023.

The Notice of Grant of Utility Model Patent Rights received in the corresponding Chinese Application 202090001215.4, mailed Apr. 7, 2024.

The Notice of First Examination Opinion received in the corresponding Chinese Application 202090001215.4, mailed Jan. 23, 2024.

The Notice of Reasons for Refusal received in the corresponding Japanese Application 2022-551320, mailed Jan. 17, 2024.

The first office action received in the corresponding Chinese Application 202011271054.3, mailed Dec. 24, 2020.

The second office action received in the corresponding Chinese Application 202011271054.3, mailed Jan. 15, 2021.

The third office action received in the corresponding Chinese Application 202011271054.3, mailed Feb. 3, 2021.

Notification to Grant Patent Right received in the corresponding Chinese Application 202011271054.3, mailed Jun. 25, 2021.

Notice of Reasons for Refusal received in the corresponding Japanese Application 2022-551320, mailed Sep. 19, 2023.

International Search Report received in the corresponding International Application PCT/CN2020/128861, mailed Apr. 29, 2021.

* cited by examiner

BOX, BATTERY, ELECTRICAL DEVICE AND METHOD FOR MANUFACTURING BATTERY

CROSS-REFERENCE TO RELATED APPLICATIONS

This application is a continuation of International Application PCT/CN2020/128861, filed Nov. 13, 2020, and entitled "BOX, BATTERY, ELECTRICAL DEVICE AND METHOD FOR MANUFACTURING BATTERY", which is incorporated herein by reference in its entirety.

TECHNICAL FIELD

The present disclosure relates to the technical field of energy storage devices, and in particular, to a box, a battery, an electrical device and a method for manufacturing the battery.

BACKGROUND ART

The key to sustainable development of automobile industry is the energy saving and emission reduction. In this case, electric vehicles, thanks to their advantages of energy saving and environmental protection, have become important for the sustainable development of the automobile industry. For electric vehicles, battery technology is an important factor in their development.

In development of battery technology, in addition to improving the performances of batteries, the safety issue is also a problem incapable of being ignored.

SUMMARY

The purpose of the present disclosure is to provide a box, a battery, an electrical device and a method for manufacturing the battery, which can improve the safety performances of the battery.

The present disclosure is achieved through the following technical solutions.

In the first aspect, it provides a box, applicable to a battery, the battery including a battery cell, in which the box includes:

a plurality of box walls, in which the plurality of box walls enclose a first chamber for accommodating the battery cell, and at least one of the box walls is internally provided with a second chamber for accommodating fire-fighting agent.

Herein, the first chamber and the second chamber are configured to be able to communicate with each other when the battery cell is thermal-runaway, so that the fire-fighting agent releases fire-fighting medium into the first chamber.

In the box, the battery cell can be accommodated in the first chamber, and fire-fighting agent can be accommodated in the second chamber of the box wall, in which when the battery cell is thermal-runaway, the second chamber can communicate with the first chamber, so that fire-fighting agent releases the fire-fighting medium into the first chamber, so as to extinguish the fire or dilute the concentration of the emissions produced by the thermal runaway of the battery cell, through the fire-fighting medium, thereby ensuring the safety of the battery.

In some embodiments of the present disclosure, when the first chamber and the second chamber are not in communication, internal pressure of the second chamber is greater than that of the first chamber.

In the above technical solution, when the first chamber and the second chamber are in communication, since the internal pressure of the second chamber is greater than the internal pressure of the first chamber, the fire-fighting medium can quickly enter the first chamber, and the response speed is fast.

In some embodiments of the present disclosure, the box walls are provided with a communication port for allowing the first chamber to be communicated with the second chamber.

In the above technical solution, the first chamber and the second chamber are communicated through the communication port, so that the fire-fighting medium can enter the first chamber.

In some embodiments of the present disclosure, the box further includes: an electric control valve, for closing the communication port, in which the electric control valve is configured to open when the battery cell is thermal-runaway, so as to make the first chamber communicated with the second chamber.

In the above technical solution, the opening or closing of the communication port is controlled by the electric control valve, so that the release of the fire-fighting medium can be precisely controlled, improving the flexibility of the release of the fire-fighting medium.

In some embodiments of the present disclosure, the box includes: a weak member, configured for closing the communication port, in which the weak member is configured to be able of being broken when pressure of the second chamber reaches a third threshold, so that the first chamber and the second chamber is communicated with each other.

In the above technical solution, the weak member closes the communication port, in which when the battery cell is thermal-runaway, the pressure in the second chamber can be increased to a third threshold to damage the weak member, so that the fire-fighting medium is quickly ejected through the communication port, to extinguish a fire quickly.

In some embodiments of the present disclosure, the box further includes: a conduit, in which the conduit is located in the first chamber, and one end of the conduit is configured to be connected with the box, so that an inside of the conduit is communicated with the second chamber through the communication port, when the battery cell is thermal-runaway; and at least a portion of the conduit is configured to be able of being broken by emissions from the thermal runaway of the battery cell.

In the above technical solution, the conduit can extend to a wider range. At the position corresponding to the battery cell, when the thermal runaway of the battery cell occurs, the conduit can be broken by the emissions generated by the thermal runaway of the battery cell, so as to release the fire-fighting medium at a fixed spot and quickly extinguish a fire.

In some embodiments of the present disclosure, the other end of the conduit is closed.

In the above technical solution, the other end of the conduit is closed, so that after the thermal runaway of the battery cell, the fire-fighting medium in the conduit can be collected to the broken part of the conduit to be discharged.

In some embodiments of the present disclosure, the box further includes: a conduit, in which the conduit is located in the first chamber, two ends of the conduit are respectively in communication with the second chamber, and at least a portion of the conduit is configured to be capable of being broken by emissions generated by the thermal runaway of the battery cell.

In the above technical solution, both ends of the conduit are communicated with the second chamber respectively, and the outlet of the second chamber is increased. After the conduit is broken by the emissions generated by the thermal runaway of the battery cells, more fire-fighting medium can enter the first chamber so as to quickly extinguish the fire.

In some embodiments of the present disclosure, the battery cell includes a first pressure-relief mechanism, and the first pressure-relief mechanism is configured to actuate to release pressure when internal pressure of the battery cell reaches a first threshold or temperature of the battery cell reaches a second threshold; and at least a portion of the conduit is disposed opposite the first pressure-relief mechanism.

In the above technical solution, the first pressure-relief mechanism can be actuated to release the pressure, when the internal pressure of the battery cell exceeds the first threshold or the temperature of the battery cell exceeds the second threshold. At least part of the conduit is arranged correspondingly to the first pressure-relief mechanism. When the first pressure-relief mechanism is actuated, the emissions from the first pressure-relief mechanism can damage the part of the conduit, so that the fire-fighting medium flowing through the conduit is released into the first chamber, and the battery cell, that is thermal-runaway, is subject to the fire extinguishment at the fixed spot.

In some embodiments of the present disclosure, the conduit includes a weak part which is disposed opposite the first pressure-relief mechanism, and the weak part is configured to be capable of being broken by emissions from the thermal runaway of the battery cell.

In the above technical solution, the weak part in the arrangement is easy to be broken by the emissions discharged by the first pressure-relief mechanism, so that the fire-fighting medium is quickly ejected.

In some embodiments of the present disclosure, the conduit includes a hot-melt part, which is disposed opposite the first pressure-relief mechanism, and the hot-melt part is configured to be able of being thermally melted or broken by emissions when the battery cell is thermal-runaway.

In the above technical solution, the hot-melt part is arranged to be easily melted by the high temperature of the first chamber or by the emissions discharged from the first pressure-relief mechanism, and the fire-fighting medium can extinguish the fire for the first pressure-relief mechanism at a fixed spot.

In some embodiments of the present disclosure, the box further includes: a hot-melt member, configured for closing the communication port, in which the hot-melt member is configured to be able to be thermally melted when the battery cell is thermal-runaway, so that the first chamber and the second chamber are communicated with each other.

In the above technical solution, the hot-melt member closes the communication port to block the fire-fighting agent, in which when the battery cell is thermal-runaway, the hot-melt member can be thermally melted, and the second chamber communicates with the first chamber to quickly release the fire-fighting medium and the response speed is quick.

In some embodiments of the present disclosure, each of the box walls is provided with a weak zone, which is configured to be able of being broken when pressure in the second chamber reaches a third threshold, so that the first chamber is communicated with the second chamber.

In the above technical solution, weak zones are arranged in different areas of the box wall to quickly respond to the thermal runaway of the battery cells.

In some embodiments of the present disclosure, the fire-fighting medium includes a gas fire-fighting medium.

In the above technical solution, the gas fire-fighting medium has good fluidity, which can dilute the concentration of the emissions discharged from the thermal runaway of the battery cell, so as to quickly extinguish the fire.

In some embodiments of the present disclosure, the first chamber has an exhaust port, and the fire-fighting medium and the emissions generated by the thermal runaway of the battery cell, after being mixed in the first chamber, can be discharged out of the box through the exhaust port.

In the above technical solution, the exhaust port can facilitate the discharging of the mixture in the first chamber, so as to release the pressure of the first chamber, ensuring the safety of the battery.

In some embodiments of the present disclosure, the box further includes a second pressure-relief mechanism, the second pressure-relief mechanism is provided at the exhaust port, and the second pressure-relief mechanism is configured to be actuated to relieve pressure when pressure within the first chamber reaches a fourth threshold or temperature within the first chamber reaches a fifth threshold.

In the above technical solution, through the second pressure-relief mechanism at the exhaust port, the pressure in the first chamber can be managed, in which when the pressure or temperature in the first chamber does not reach the actuation condition of the second pressure-relief mechanism, the fire-fighting medium can be mixed with the emissions generated by the thermal runaway of the battery cell in the first chamber, to dilute the concentration of the combustible gas and play a role in extinguishing the fire; and when the second pressure-relief mechanism reaches the actuation condition, the second pressure-relief mechanism can be actuated to release pressure, ensuring the safety of the box.

In some embodiments of the present disclosure, the box further includes: a trigger member, arranged in the second chamber and configured for triggering the fire-fighting agent to generate the fire-fighting medium when the battery cell is thermal-runaway.

In the above scheme, the fire-fighting agent is triggered by the trigger member to generate the fire-fighting medium, in which the control is flexible, and the fire-fighting agent does not need to be sealed under increased pressure.

In some embodiments of the present disclosure, each of the box walls is provided with an injection port communicating with the second chamber, and the injection port is configured to inject into the second chamber the fire-fighting agent.

In the above technical solution, the fire-fighting agent is injected into the second chamber through the injection port, which is convenient for operation.

In some embodiments of the present disclosure, the injection port is located on a side of the box wall away from the first chamber.

In the above technical solution, by arranging an injection port on the side of the box wall away from the first chamber, it is convenient to inject the fire-fighting agent externally, so as to avoid interference with the components in the first chamber.

In some embodiments of the present disclosure, the box further includes: an injection valve, arranged at the injection port.

In the above technical solution, the one-way injection of the fire-fighting agent is realized through the injection valve, which not only facilitates the injection of the fire-fighting agent, but also prevents the fire-fighting agent from leaking from the second chamber.

In a second aspect, a battery is provided, including: a battery cell; and the above-mentioned box, in which the battery cell is accommodated in the first chamber.

In a third aspect, an electrical device is provided, including the aforementioned battery.

In a fourth aspect, a method for manufacturing a battery is provided, the method including:

providing a box, including a plurality of box walls, in which the plurality of box walls enclose a first chamber, at least one of the box walls is internally provided with a second chamber, and the second chamber accommodates fire-fighting agent; providing a battery cell; and making the battery cell accommodated in the first chamber, in which the first chamber and the second chamber are configured to communicate with each other when the battery cell is thermal runaway, enabling the fire-fighting agent to release the fire-fighting medium into the first chamber.

BRIEF DESCRIPTION OF DRAWINGS

In order to illustrate the technical solutions of the embodiments of the present disclosure more clearly, the drawings required in the embodiments of the present disclosure will be introduced below. Obviously, the drawings described below only show some embodiments of the present disclosure. For those skilled in the art, other drawings can also be obtained according to the drawings without any creative efforts.

Figures 1, 2:
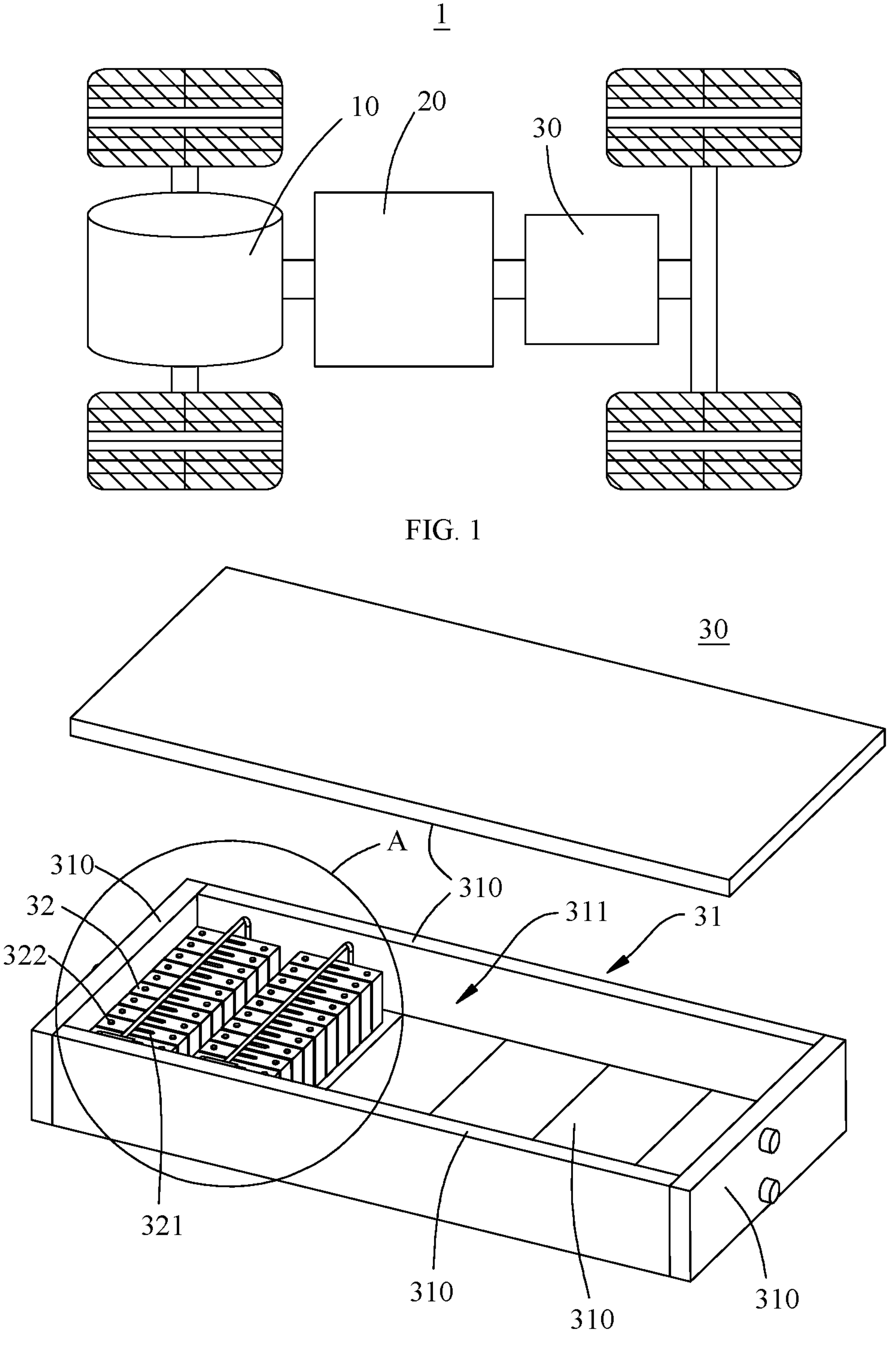
FIG. 1 is a schematic structural diagram of a vehicle provided by an embodiment of the present disclosure.
FIG. 2 is a schematic structural diagram of a battery provided by an embodiment of the present disclosure.

Description of Reference Numbers: 1—vehicle; 10—motor; 20—controller; 30—battery; 31—box; 310—box wall; 310*a*—side wall; 310*b*—bottom wall; 310*c*—beam; 310*d*—top wall; 3101—second chamber; 3102—exhaust port; 3103—injection port; 3104—communication port; 3105—weak member; 3107—nick; 3108—weak zone; 311—first chamber; 312—second pressure-relief mechanism; 313—injection valve; 314—electric control valve; 315—circuit; 3151—weak part; 3152—third chamber; 316—hot—melt member; 32—battery cell; 321—first pressure-relief mechanism; 322—electrode terminal.

DETAILED DESCRIPTION OF EMBODIMENTS

The embodiments of the present disclosure will be described in further detail below with reference to the drawings and embodiments. The following detailed description of the embodiments and the drawings are used to illustrate the principles of the present disclosure exemplarily, but should not be used to limit the scope of the present disclosure, that is, the present disclosure is not limited to the described embodiments.

It should be noted that similar numerals and letters refer to similar items in the following drawings, so that once an item is defined in one drawing, it is not required to further define and explain it in subsequent drawings.

In the description of the embodiments of the present disclosure, it should be noted that the indicated orientation or positional relationship is based on the orientation or positional relationship shown in the drawings, or the orientation or positional relationship in which the product of the present disclosure is usually placed in use, or the orientation or positional relationships commonly understood by those skilled in the art, which is only for the purpose of the convenience of describing the present disclosure and simplifying the description, rather than indicating or implying that the referred device or element must be in a specific orientation, be constructed and operated in a specific orientation, and therefore cannot be understood to limit the present disclosure. Furthermore, the terms, “first”, “second”, "third", etc., are only used to describe the distinguishing, and should not be construed as indicating or implying importance of relativity.

In the description of the present disclosure, it should be noted that, unless otherwise expressly specified and limited, the terms, "installed", "connected", "communicated" and "attached", should be understood in a broad sense. For example, it may be a fixed connection, a detachable connection, or an integral connection; it can be a direct connection, or an indirect connection through an intermediate medium, and it can be an internal communication between two components. For those skilled in the art, the specific meanings of the above terms in the present disclosure can be understood according to specific situations.

The term "and/or" in the present disclosure only refers to an association relationship for describing the associated objects, which means that there can be three kinds of relationships, for example, A and/or B can mean three situations, i.e., A exists alone, A and B exist at the same time, B exists alone. In addition, the character "/" in the present disclosure generally indicates the "or" relationship of the related objects before and after it.

In the present disclosure, "plurality" refers to two or more (including two), and similarly, "multiple groups" refers to two or more groups (including two groups).

In the present disclosure, the battery cell may include lithium-ion secondary batteries, lithium-ion primary batteries, lithium-sulfur batteries, sodium-lithium-ion batteries, sodium-ion batteries, or magnesium-ion batteries and etc., which are not limited in the embodiments of the present disclosure. The battery cell may be in the form of a cylinder, a flat body, a rectangular parallelepiped, or other shapes, which are not limited in the embodiments of the present disclosure. The battery cells are generally divided into three types according to the packaging method: a cylindrical battery cell, a square battery cell, and a soft-pack battery cell, which are not limited in the embodiments of the present disclosure.

The battery mentioned in the embodiments of the present disclosure refers to a single physical module including one or more battery cells to provide higher voltage and capacity. For example, the battery mentioned in the present disclosure may include battery modules or battery packs, and the like. The battery typically includes a box for enclosing one or more battery cells. The box can prevent liquids or other foreign objects from affecting the charging or discharging of the battery cell.

The battery cell includes an electrode assembly and an electrolyte, and the electrode assembly is composed of a positive electrode sheet, a negative electrode sheet and a separator. The battery cell works, mainly relying on the movement of metal ions between the positive and negative electrode sheets. The positive electrode sheet includes a positive electrode current collector and a positive electrode active material layer. The positive electrode active material layer is coated on the surface of the positive electrode current collector. The current collector without being coated with the positive electrode active material layer protrudes from the current collector coated with the positive electrode active material layer, and the current collector without being coated with the positive electrode active material layer is used as the positive electrode tab (also called as the positive tab). With a lithium-ion battery as an example, the material of the positive electrode current collector can be aluminum, and the positive electrode active material can be lithium cobalt oxide, lithium iron phosphate, ternary lithium, or lithium manganite, etc. The negative electrode sheet includes a negative electrode current collector and a negative electrode active material layer. The negative electrode active material layer is coated on the surface of the negative electrode current collector. The current collector without being coated with the negative electrode active material layer protrudes from the current collector coated with the negative electrode active material layer. The current collector without being coated with the negative electrode active material layer is used as the negative electrode tab (also called as the negative tab). The material of the negative electrode current collector can be copper, and the negative electrode active material can be carbon or silicon, etc. In order to ensure that a large current passes without fusing, the number of the positive tabs is plural and stacked together, and the number of the negative tabs is plural and stacked together. The material of the separator can be PP (polypropylene) or PE (polyethylene), and the like. In addition, the electrode assembly may be of a wound structure or a laminated structure, and the embodiment of the present disclosure is not limited thereto.

Many design factors need to be considered simultaneously for the development of battery technology, such as energy density, cycle life, discharge capacity, charge-discharge rate and other performance parameters. In addition, the safety of the battery also needs to be considered.

For battery cells, the main safety hazard happens during the charging and discharging process, as well as the appropriate ambient temperature design is needed. In order to effectively avoid unnecessary losses, there are generally at least three protection measures for battery cells. Specifically, the protection measures include at least the switch elements, the appropriate isolation diaphragm materials selected, and the pressure-relief mechanisms. The switching element refers to an element that can stop the charging or discharging of the battery when the temperature or resistance in the battery cell reaches a certain threshold. The separator is used to separate the positive electrode sheet and the negative electrode sheet. When the temperature rises to a certain value, the micro-scale (or even nano-scale) micro-pores attached to it can be automatically dissolved, so that the metal ions cannot pass through the separator and terminate the internal reaction within the battery cell.

The pressure-relief mechanism refers to an element or component that is actuated to relieve the internal pressure or temperature, when the internal pressure or temperature of the battery cell reaches a predetermined threshold. The threshold design varies according to different design requirements. The threshold value may depend on one or more of the materials of the positive electrode sheet, the negative electrode sheet, the electrolyte and the separator in the battery cell. The pressure-relief mechanism can be in the form of an explosion-proof valve, a gas valve, a pressure relief valve or a safety valve, etc., and can be specifically in a pressure-sensitive or temperature-sensitive element or structure. That is, when the internal pressure or temperature of the battery cell reaches a predetermined threshold, the pressure-relief mechanism performs an action or the weak structure provided in the pressure-relief mechanism is broken, such that an opening or channel for releasing the internal pressure or temperature is formed.

The "actuation" mentioned in the present disclosure means that the pressure-relief mechanism is actuated or activated to a certain state, so that the internal pressure and temperature of the battery cell can be released. Actions produced by the pres sure-relief mechanism may include, but are not limited to, at least a portion of the pres sure-relief mechanism being ruptured, shattered, torn or opened, and the like. When the pressure-relief mechanism is actuated, the high-temperature and high-pressure substances inside the battery cell will be discharged out from the actuated part as a discharge. In this way, the pressure and temperature of the battery cell can be released under controllable pressure or temperature, so as to avoid potential more serious accidents.

The emissions from the battery cell mentioned in the present disclosure include, but are not limited to: electrolyte, dissolved or split fragments of positive and negative electrode sheets and separators, high temperature and high pressure gases (flammable gases, such as $CH_4$, CO), flames, etc., which are produced by reaction.

The pressure-relief mechanism on the battery cell has an important impact on the safety of the battery. For example, when phenomena, such as overheating, short circuit, overcharge, collision, etc., occur, a large amount of gas may be generated inside the battery cell in a short time, and the internal temperature of the battery cell may rise rapidly, which may eventually lead to situations of the explosion and fire, etc. of the battery cell. This phenomenon is called as thermal runaway of the battery cell. In this case, the internal pressure and temperature can be released through the actuation of the pressure-relief mechanism, to prevent the battery cell from exploding and catching fire.

The inventors found that after the pressure-relief mechanism on the battery cell was actuated, the discharged emissions accumulated inside the box, which was likely to cause the battery to burn or even explode. Even if the emissions were discharged into the air, due to the high temperature and concentration of the emissions generated by the thermal runaway of the battery cell, once the emissions came into contact with the oxygen-enriched air, it was easy to catch fire and leaded to an explosion, posing a greater safety hazard.

In view of this, the present disclosure provides a technical solution, which utilizes the inner space of the box wall to store the fire-fighting agent. When the battery cell is thermal-runaway, the fire-fighting agent can release the fire-fighting medium into the inner space of the box, and the fire-fighting medium dilutes concentration of the emissions of the fire-fighting medium, reducing the concentration of combustible gas, and then extinguishing or preventing combustion of combustible gas, thereby further enhancing the safety of the battery. It should be pointed out that the inner space of the box wall can be understood as a structure in which the box wall is hollow, and the hollow part of the box wall is the inner space of the box wall; and the inner space of the box refers to the space enclosed by multiple box walls for accommodating the battery cell.

The technical solutions described in the embodiments of the present disclosure are all applicable to various devices using batteries, such as mobile phones, portable devices, notebook computers, battery cars, electric toys, electric tools, electric vehicles, ships, and spacecraft, etc., for example, spacecraft include aircraft, rockets, space shuttles and spacecraft, etc.

It should be understood that the technical solutions described in the embodiments of the present disclosure are not only applicable to the above-described devices, but also applicable to all devices using batteries. However, for the sake of brevity, the following embodiments are described by taking electric vehicles as an example.

For example, FIG. 1 shows a schematic structural diagram of a vehicle 1 provided by an embodiment of the present disclosure. The vehicle 1 may be a fuel vehicle, a gas vehicle, or a new energy vehicle. The new energy vehicle may be a pure electric vehicle, a hybrid vehicle, or a range-extended car, etc. A battery 30 is provided inside the vehicle 1. For example, the battery 30 may be provided at the bottom, the front or the rear of the vehicle 1. The battery 30 can be used for supplying power to the vehicle 1. For example, the battery 30 can be used as the operating power source of the vehicle 1, which is used for the circuit system of the vehicle 1, for example, for requirements of the working power of the starting, navigation and running of the vehicle 1. In another embodiment of the present disclosure, the battery 30 can be used as not only the operating power source of the vehicle 1, but also the driving power source of the vehicle 1, to provide the driving force for the vehicle 1 in place of or partially in place of fuel or natural gas.

A motor 10 and a controller 20 may also be provided inside the vehicle 1, and the controller 20 is used to control the battery 30 to supply power to the motor 10, for example, for requirements of working electricity of starting, navigating, and running the vehicle 1.

In order to meet different power requirements, the battery 30 may include a plurality of battery cells 32, in which the plurality of battery cells 32 may be connected in series or in parallel or in a mixed connection, in which the mixed connection refers to a mixture of series and parallel connections. The battery 30 may also be referred to as a battery pack. In some embodiments, a plurality of battery cells 32 may be firstly connected in series or in parallel or in mixing manner, to form a battery module, and then a plurality of battery modules may be connected in series or in parallel or in mixing manner to form a battery 30. That is to say, the plurality of battery cells 32 may form the battery 30 directly, or may form a battery module first, and then the battery module may form the battery 30.

FIG. 2 shows a schematic structural diagram of a battery 30 provided by an embodiment of the present disclosure. In FIG. 2, the battery 30 may include a plurality of battery cells 32 and a box 31, in which the box 31 is of a hollow structure, the box 31 includes a plurality of box walls 310, and the plurality of box walls 310 enclose a first chamber 311, the plurality of battery cells 32 are accommodated in the first chamber 311.

According to different power requirements, the number of battery cells 32 can be set to any value. A plurality of battery cells 32 may be connected in series, in parallel or in a mixing manner to achieve larger capacity or power. Since the number of battery cells 32 contained in the battery 30 may be relatively great, in order to facilitate the installation, the battery cells 32 may be arranged in groups, in which each group of battery cells 32 constitutes a battery module. The number of battery cells 32 included in the battery module is not limited, and can be set according to requirements. The battery 30 may include a plurality of battery modules, and these battery modules may be connected in series, parallel, or a mixing manner.

The battery cell 32 includes one or more electrode assemblies (not shown in the drawings), a casing and a cover plate. The casing and the cover plate form a housing or a battery compartment. Both the wall of the housing and the wall of the cover plate are referred to as the wall body of the battery cell 32. The casing is determined according to the shape of the combined one or more electrode assemblies. For example, the casing can be of a hollow cuboid, a cube or a cylinder, and at least one face of the casing has an opening, so that one or more electrode assemblies can be placed in the casing. For example, when the casing is of a hollow cuboid or cube, one plane of the casing is an open face, that is, this face has no solid body, so that the inside and outside of the casing communicate with each other. When the casing can be of a hollow cylinder, the end face of the casing is an open face, that is, the end face does not have a wall body, so that the inside and outside of the casing communicate with each other. The cover body covers the opening and is connected with the casing, to form a closed chamber in which the electrode assembly is placed. The casing is filled with electrolyte, such as electrolyte.

The battery cell 32 may further include two electrode terminals 322, and the two electrode terminals 322 may be disposed on the cover plate. The cover plate is usually in the shape of a flat plate, and two electrode terminals 322 are fixed on the flat face of the cover plate, and the two electrode terminals 322 are respectively a positive electrode terminal and a negative electrode terminal. Each electrode terminal 322 is correspondingly provided with a connecting member (not shown in the drawing), or may also be called as a current collecting member, used for electrically connecting the electrode assembly and the electrode terminal 322.

When the electrode assembly includes a positive electrode tab and a negative electrode tab, one current collecting member connects the positive electrode tab and the positive electrode terminal, and the other current collecting member connects the negative electrode tab and the negative electrode terminal.

A first pressure-relief mechanism 321 may also be provided on the battery cell 32. The first pressure-relief mechanism 321 is used to be actuated to release the pressure when the internal pressure of the battery cell 32 reaches the first threshold or the temperature of the battery cell 32 reaches the second threshold. Since the internal temperature of the battery cell 32 increases, the internal pressure of the battery cell 32 increases, in which when the first pressure-relief mechanism 321 is actuated, the internal pressure of the battery cells 32 is released, or the internal temperature of the battery cell 32 decreases along with the emissions of high-pressure and high-temperature being discharged.

The first pressure-relief mechanism 321 may be of various possible pressure relief structures, which are not limited in this embodiment of the present disclosure. For example, the first pressure-relief mechanism 321 may be a pressure-sensitive pressure-relief mechanism configured to rupture when the internal pressure of the battery cell 32 provided with the first pressure-relief mechanism 321 reaches a first threshold; and/or, the first pressure-relief mechanism 321 may be a temperature-sensitive pressure-relief mechanism, and the temperature-sensitive pressure-relief mechanism is configured to be able to melt when the internal temperature of the battery cell 32 provided with the first pressure-relief mechanism 321 reaches a second threshold.

Figures 3, 4:
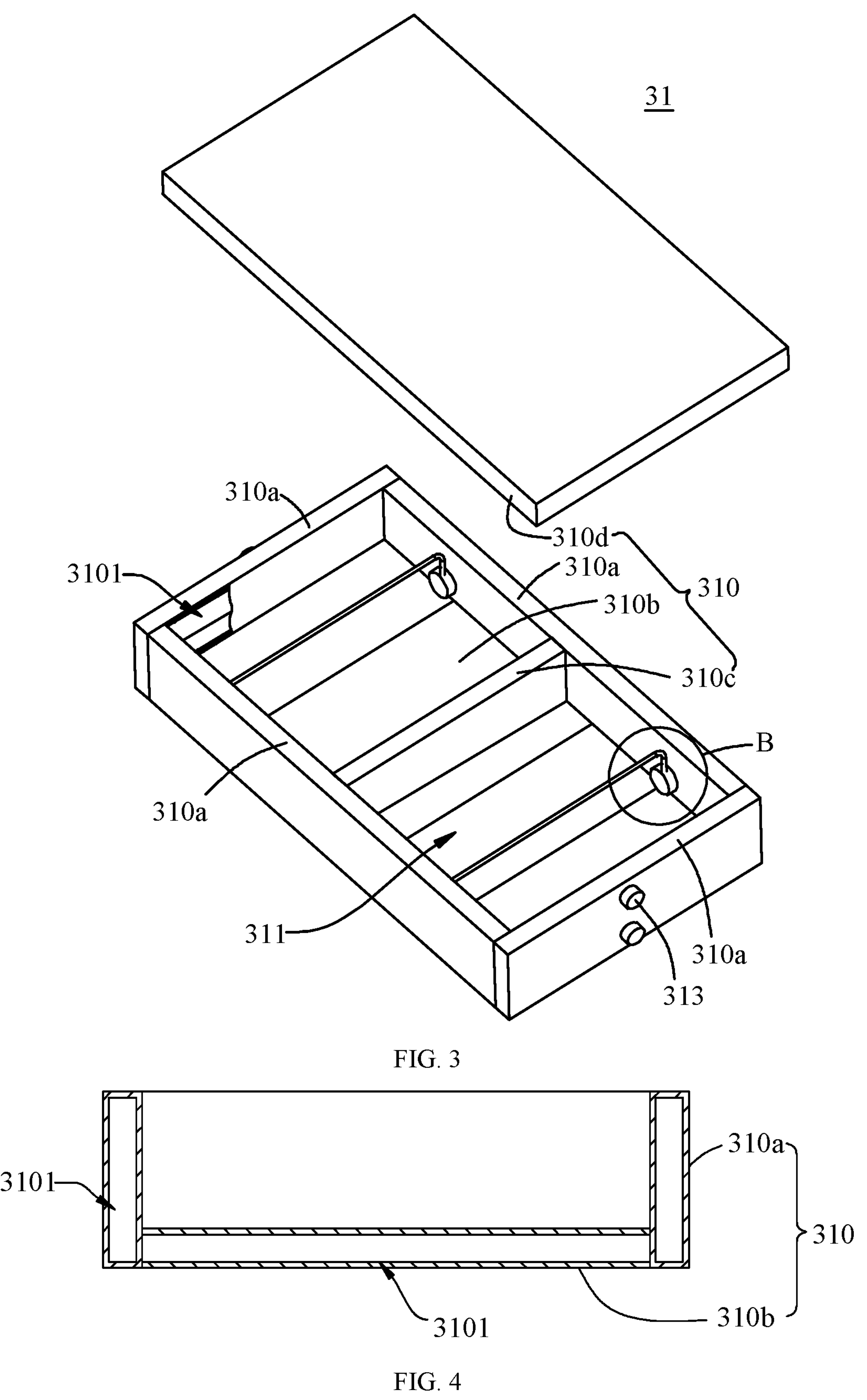
FIG. 3 is a schematic structural diagram of a box provided by an embodiment of the present disclosure.
FIG. 4 is a cross-sectional view of a box provided by an embodiment of the present disclosure.

FIG. 3 shows a schematic structural diagram of a box 31 provided by an embodiment of the present disclosure. In FIGS. 2 and 3, the box 31 includes a plurality of box walls 310, the plurality of box walls 310 enclose a first chamber 311, and a plurality of battery cells 32 are accommodated in the first chamber 311. At least one box wall 310 is internally provided with a second chamber 3101, and the fire-fighting agent is contained in the second chamber 3101. The first chamber 311 and the second chamber 3101 are configured to be able to communicate with each other when the battery cell 32 is thermal-runaway, so that the fire-fighting agent releases the fire-fighting medium into the first chamber 311. It should be noted that, before the thermal runaway of the battery cell 32, the first chamber 311 and the second chamber 3101 may or may not be communicated with each other, depending on the actual situation.

In the box 31 of the embodiment of the present disclosure, not only the battery cell 32 is accommodated in the first chamber 311, but also the fire-fighting agent is accommodated in the second chamber 3101, and the fire-fighting agent is wholly contained inside the box wall 310, saving the space. When the battery cell 32 is thermal-runaway, the second chamber 3101 can communicate with the first chamber 311, so that the fire-fighting agent releases the fire-fighting medium into the first chamber 311, so as to extinguish the fire or dilute concentration of combustible gas in the emissions generated by the thermal runaway of the battery cell 32, through the fire-fighting medium, which further ensures the safety of the battery 30.

The fire-fighting medium in the embodiment of the present disclosure may be a fluid, and the fluid may be a liquid or a gas.

The fire-fighting agent in the embodiments of the present disclosure may be a gas, or a liquid or solid capable of generating a gas fire-fighting medium. When the fire-fighting agent is a gas fire-fighting agent, the fire-fighting medium is the fire-fighting agent itself. For example, the fire-fighting agent can be gaseous $CO_2$ (Carbon dioxide), $SF_6$ (Sulfur hexafluoride) or $N_2$ (Nitrogen). When the fire-fighting agent is a liquid fire-fighting agent, the fire-fighting medium is a gas fire-fighting medium after phase change or chemical reaction of the liquid fire-fighting agent, and the liquid fire-fighting agent is a liquid with a low melting point. For example, the fire-fighting agent can be liquid perfluorohexanone, hexafluoropropane or heptafluoropropane. When the fire-fighting agent is a solid fire-fighting agent, the fire-fighting medium can be the gas after the phase-change of the fire-fighting agent. For example, the fire-fighting agent can be dry ice, which is vaporized to play the role of cooling and extinguishing fire. The fire-fighting medium can also be gas generated after a chemical reaction of the fire-fighting agent. For example, the fire-fighting agent can be aerosol-type solids (such as, potassium nitrate, sodium nitrate, etc.), and the aerosol-type solid undergoes chemical reaction to generate a large amount of inert gas to consume free oxygen and dilute concentration of the flammable gas discharged from the battery cell 32.

The battery 30 may also include a battery management system (BMS). The battery management system is an important part of the system of the electric vehicle power battery 30. It can detect, collect and preliminarily calculate the real-time state parameters of the battery 30, and at the same time, controls the on-off of the power supply circuit according to the comparison relationship between the detected value and the allowable value.

The battery 30 may further include a thermal runaway sensing element, and the thermal runaway sensing element may include one or more of a smoke sensor, a temperature sensor, a light sensor, and a pressure sensor, in which the thermal runaway signal of the battery cell 32 is collected and transmitted to the battery management system, and the battery management system issues a command signal after analysis, so as to control the actions of the corresponding control elements.

In some embodiments, as shown in FIG. 3, the plurality of box walls 310 may include a top wall 310*d*, side walls 310*a*, and a bottom wall 310*b*, in which the top wall 310*d* and the bottom wall 310*b* are disposed opposite to each other, and the side walls 310*a* are disposed around the bottom wall 310*b*, the top wall 310*d*, the side walls 310*a* and the bottom wall 310*b* together define a first chamber 311, and at least one of the top wall 310*d*, the side walls 310*a* and the bottom wall 310*b* is internally provided with a second chamber 3101.

It should be pointed out that each box wall 310 may be provided with one second chamber 3101, or may be provided with a plurality of second chambers 3101, so as to release the fire-fighting medium at different positions.

In order to facilitate the assembly of the battery cell 32, the top wall 310*d* can be understood as a cover body, and the structure formed by the side walls 310*a* and the bottom wall 310*b* can be understood as a box body. The box body has an opening to facilitate the placement of the battery cells 32. The cover body covers the opening, so as to form, together with the box body, a first chamber 311, for encapsulating the battery cell 32.

One or more sidewalls 310*a* may be provided. When one sidewall 310*a* is provided, for example, the box 31 may be of a cylindrical structure, and the sidewall 310*a* may be of a cylinder. When plural sidewalls 310*a* are provided, for example, a box body 31 can be of a rectangular parallelepiped structure. The plurality of side walls 310*a* can be integrally formed or welded together, so as to ensure the plurality of side walls 310*a* are the connected firmly. As for connection manner, the side walls 310*a* and the bottom wall 310*b* may be integrally formed, or the side walls 310*a* and the bottom wall 310*b* may be welded, or the side walls 310*a* and the bottom wall 310*b* may be connected by connecting members, which may be bolts.

In some embodiments, as shown in FIG. 3, the plurality of box walls 310 may further include beams 310*c* located between two opposite side walls 310*a*, and the beams 310*c* may divide the first chamber 311 into a plurality of regions, a plurality of battery cells 32 are distributed in a plurality of regions. The height of the beam 310*c* may be flush with the height of the side wall 310*a*, or the height of the beam 310*c* may also be lower than the height of the side wall 310*a*. The beam 310*c* may be connected with the side wall 310*a* and/or the bottom wall 310*b* to ensure the overall strength of the box 31. As for connection manner, the beam 310*c* and the side wall 310*a* and/or the bottom wall 310*b* may be integrally formed, may also be welded, or may be connected by fasteners (e.g., bolts). The beam 310*c* may be provided with a second chamber 3101 to facilitate the storage of fire-fighting agent, which increases the storage points of fire-fighting agents, facilitating the release of fire-fighting medium at plural points to improve fire-extinguishment efficiency.

Figure 5:
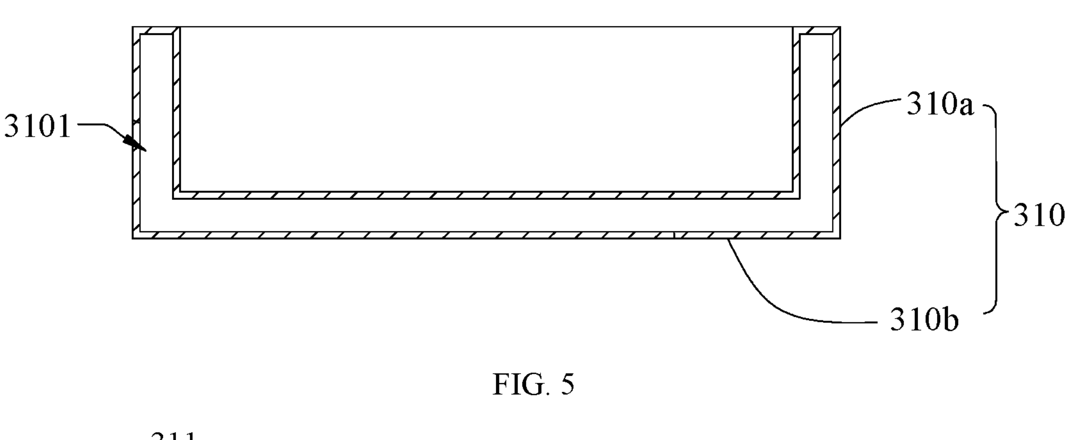
FIG. 5 is a cross-sectional view of a box provided by another embodiment of the present disclosure.

FIG. 4 shows a cross-sectional view of the box 31 provided by an embodiment of the present disclosure, and FIG. 5 shows a cross-sectional view of the box 31 provided by another embodiment of the present disclosure. When the box 31 is provided with a plurality of second chambers 3101, the plurality of second chambers 3101 may be independent of each other (as shown in FIG. 4), or communicated with each other (as shown in FIG. 5), which is set according to the actual situation.

Figure 6:
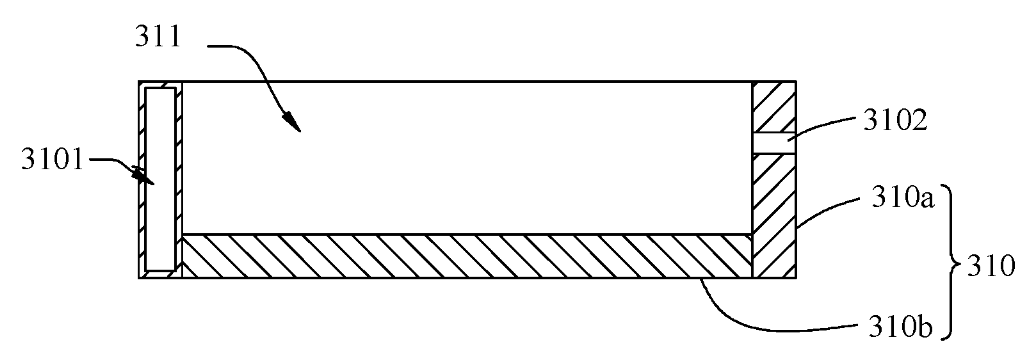
FIG. 6 is a schematic diagram of an exhaust port provided by an embodiment of the present disclosure.

FIG. 6 shows a schematic diagram of the exhaust port 3102 provided by an embodiment of the present disclosure. In some embodiments, in FIG. 6, the first chamber 311 has an exhaust port 3102. The fire-fighting medium and the emissions generated by the thermal runaway of the battery cells 32, after being mixed in the first chamber 311, form a mixture, and the mixture can be discharged out of the casing 31, passing through the exhaust port 3102. For example, the exhaust port 3102 can be formed on the side wall 310*a* (as shown in FIG. 6), or can be formed on the top wall 310*d*. The exhaust port 3102 can facilitate the discharging of the mixture in the first chamber 311 to relieve the pressure of the first chamber 311, ensuring the safety of the battery 30.

It should be pointed out that the number of the exhaust ports 3102 may be one or plural, and the number of the exhaust ports 3102 may be selected differently according to actual conditions.

In some embodiments, the number of the exhaust port 3102 is one, the exhaust port 3102 and the second chamber 3101 are independent of each other, and the exhaust port 3102 may be arranged on any box wall 310. For example, the exhaust port 3102 can be formed on the top wall 310*d*, to facilitate the discharging of the mixture in the first chamber 311.

Figure 7:
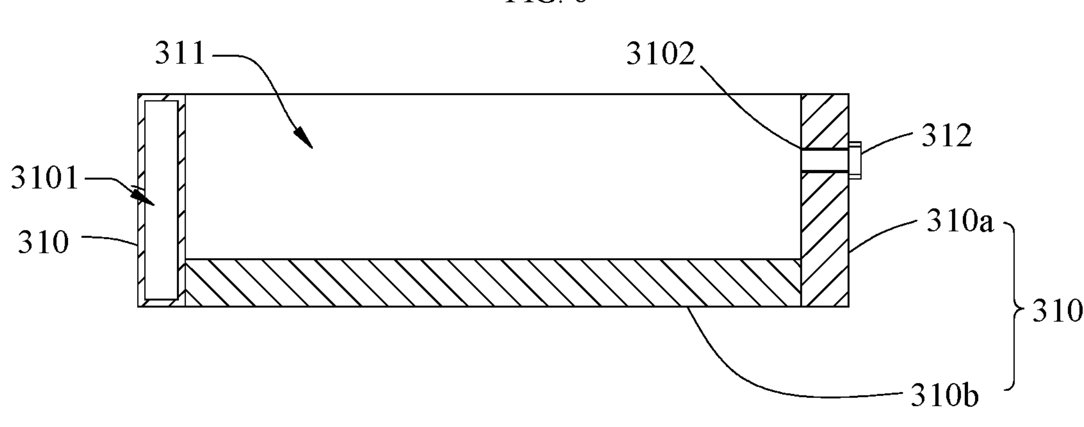
FIG. 7 is a schematic diagram of a second pressure-relief mechanism provided by an embodiment of the present disclosure.

FIG. 7 shows a schematic diagram of the second pressure-relief mechanism 312 provided by an embodiment of the present disclosure. In some embodiments, as shown in FIG. 7, the box 31 further includes a second pressure-relief mechanism 312, the second pressure-relief mechanism 312 is provided at the exhaust port 3102, and the second pressure-relief mechanism 312 is configured to be actuated to relieve the pressure when the pressure in the first chamber 311 reaches a fourth threshold or the temperature within the first chamber 311 reaches a fifth threshold. Through the second pressure-relief mechanism 312 at the exhaust port 3102, the pressure or temperature within the first chamber 311 can be managed. When the pressure or temperature in the first chamber 311 does not reach the actuation condition of the second pressure-relief mechanism 312, the second pressure-relief mechanism 312 closes the exhaust port 3102, and the fire-fighting medium can be mixed with the emissions generated by the thermal runaway of the battery cell 32, in the first chamber 311, to dilute the concentration of the combustible gas and play a role in extinguishing the fire. When the pressure or temperature in the first chamber 311 reaches the actuation condition of the second pressure-relief mechanism 312, the second pressure-relief mechanism 312 can be actuated to relieve the pressure, ensuring the safety of the box 31.

Figure 8:
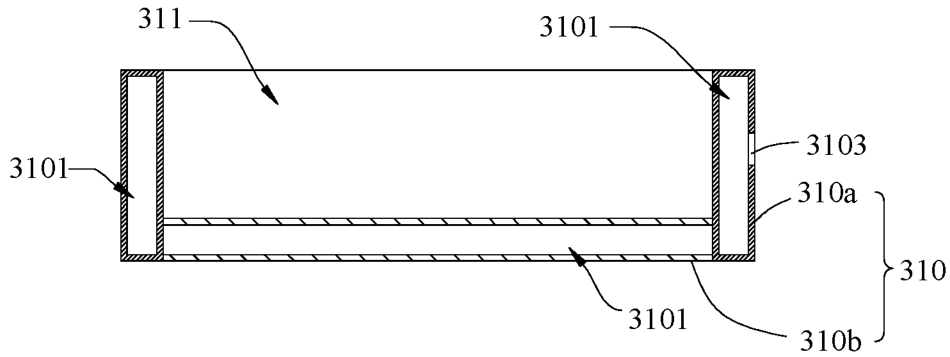
FIG. 8 is a schematic diagram of an injection port of a box wall provided by an embodiment of the present disclosure.

FIG. 8 shows a schematic diagram of the injection port 3103 of the box wall 310 provided by an embodiment of the present disclosure. In some embodiments, as shown in FIG. 8, the box wall 310 is provided with an injection port 3103 communicating with the second chamber 3101, and the injection port 3103 is used for injecting fire-fighting agent into the second chamber 3101. The fire-fighting agent is injected into the second chamber 3101 through the injection port 3103, which is convenient for operation.

In order to facilitate the injection operation, as shown in FIG. 8, the injection port 3103 can be located on the side wall 310*a*. When injecting the fire-fighting agent, the box 31 is placed flatwise on the workbench, and the fire-fighting agent is injected to the second chamber 3101 through the injection port 3103 on the side wall 310*a*.

In some embodiments, as shown in FIG. 8, the injection port 3103 may be located on the side of the box wall 310 away from the first chamber 311. By arranging the injection port 3103 on the side of the box wall 310 away from the first chamber 311, it is convenient to fill the fire-fighting agent outside the first chamber 311, so as to avoid from interfering with the components in the first chamber 311. For example, after the assembly of the battery cell 32 and the box 31, the operation of filling the fire-fighting agent is performed. In other embodiments, the injection port 3103 may be located on the side of the box wall 310 facing the first chamber 311.

According to different fire-fighting agents, the injection port 3103 can be blocked by plugs, valves and other components.

In other embodiments, the box 31 is provided with a beam 310*c*, the beam 310*c* is provided with a second chamber

3101, and the injection port 3103 on the beam 310*c* is located in the first chamber 311.

Figure 9:
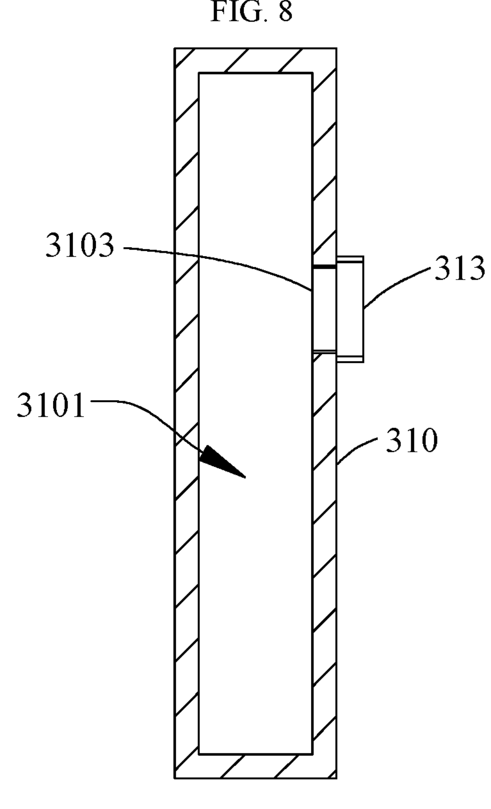
FIG. 9 is a schematic diagram of assembling an injection valve and a box wall, provided by an embodiment of the present disclosure.

FIG. 9 shows a schematic diagram of the assembly of the injection valve 313 and the box wall 310, provided by an embodiment of the present disclosure. In some embodiments, as shown in FIG. 9, the box 31 further includes an injection valve 313, and the injection valve 313 is disposed at the injection port 3103. In order to prevent the backflow of the fire-fighting agent, it can be selected that the injection valve 313 is a one-way valve. The one-way injection of the fire-fighting agent is realized through the injection valve 313, which not only facilitates the injection of the fire-fighting agent, but also prevents the fire-fighting agent from leaking from the second chamber 3101. For example, when the injection port 3103 is formed on the side of the side wall 310*a* away from the first chamber 311, as shown in FIG. 3, the injection valve 313 is provided outside the first chamber 311.

In some embodiments, when the first chamber 311 and the second chamber 3101 are not in communication, the internal pressure of the second chamber 3101 is greater than the internal pressure of the first chamber 311. When the first chamber 311 and the second chamber 3101 are in communication, since the internal pressure of the second chamber 3101 is greater than the internal pressure of the first chamber 311, the fire-fighting medium can quickly enter the first chamber 311, and the response speed is fast so as to extinguish the fire quickly.

In some embodiments, the fire-fighting agent can be sealed in the second chamber 3101 under increased pressure. Before the first chamber 311 and the second chamber 3101 are not communicated, the internal pressure of the second chamber 3101 is always greater than that of the first chamber 311. For example, gas fire-fighting agent or liquid fire-fighting agent is sealed in the second chamber 3101. After the fire-fighting agent is compressed, it can be in gaseous, liquid or solid state. For example, carbon dioxide can be in gaseous, liquid, or solid state (dry ice). After the first chamber 311 and the second chamber 3101 are communicated, the fire-fighting agent can release the gas fire-fighting medium into the first chamber 311. The gas fire-fighting medium has good fluidity, and can dilute the concentration of the combustible gas in the emissions discharged from the thermal runaway of the battery cells 32, so as to quickly extinguish the fire.

In order to detect/prove that the pressure in the second chamber 3101 is greater than the pressure in the first chamber 311, a pressure sensor can be provided in the second chamber 3101, to monitor the pressure in the second chamber 3101.

Alternatively, a pressure gauge can be provided outside the injection valve 313 or the second chamber 3101 to detect the internal pressure of the second chamber 3101. For example, a pressure sensor can be provided in the second chamber 3101 and connected to the battery management system for pressure monitoring and early warning. A pressure gauge can be connected to the injection port 3103. For example, the pressure gauge can be installed at the injection valve 313. Another opening is formed at the outside of the second chamber 3101, allowing a pressure gauge to be installed.

In some embodiments, the fire-fighting agent can be a fire-fighting agent that can be phase-changed after being pressurized, such as $CO_2$, $SF_6$, $N_2$, etc., and can be phase-changed into a liquid state after being pressurized. When the first chamber 311 and the second chamber 3101 are communicated, the internal pressure of the second chamber 3101 decreases, the fire-fighting agent is phase-changed to a gaseous state, which releases a low-temperature gas fire-fighting medium to the first chamber 311. At the same time, the heat in the first chamber 311 is absorbed through the box wall 310 during the phase changing process. After the low-temperature gas fire-fighting medium enters the first chamber 311, it is mixed with the high-temperature gas in the first chamber 311, which can reduce the temperature of the first chamber 311.

In other embodiments, the fire-fighting agent can be sealed in the second chamber 3101 under normal pressure, such as, aerosol-based solid fire-fighting agent. After the thermal runaway of the battery cell 32 and before the communication between the first chamber 311 and the second chamber 3201, the fire-fighting agent is triggered and activated under the action of the trigger member, to generate a gas fire-fighting medium, thereby increasing the internal pressure of the second chamber 3101, so that the internal pressure of the second chamber 3101 is greater than the internal pressure of the first chamber 311 when the first chamber 311 and the second chamber 3101 are not in communication.

Figure 10:
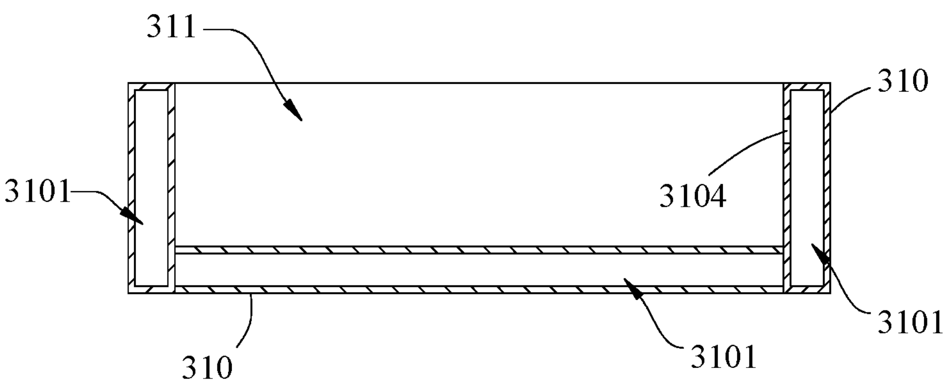
FIG. 10 is a schematic diagram of a communication port of a box wall provided by an embodiment of the present disclosure.

FIG. 10 shows a schematic diagram of the communication port 3104 of the box wall 310 provided by an embodiment of the present disclosure. In some embodiments, as shown in FIG. 10, the box wall 310 is provided with a communication port 3104 for communicating the first chamber 311 and the second chamber 3101. The first chamber 311 and the second chamber 3101 are communicated through the communication port 3104, so that the fire-fighting medium can enter the first chamber 311.

It should be understood that the communication port 3104 may be located on the side of the box wall 310 facing the first chamber 311 (the side wall 310*a*, the bottom wall 310*b*, the top wall 310*d*), or the communication port 3104 may be located at the surface of the beam 310*c* within the first chamber 311.

When the communication port 3104 on the box wall 310 is not closed, the second chamber 3101 is always in communication with the first chamber 311. In order to ensure the fire extinguishing effect, the fire-fighting agent in the second chamber 3101 can be aerosol-type solid fire-fighting agent. In the case that the fire-fighting agent is aerosol-type solid, it is needed that the aerosol-type solid is used in combination with a trigger member, a thermal runaway sensing element, and a battery management system. The trigger member is used to activate the solid fire-fighting agent to chemically react to generate inert gas. The thermal runaway sensing element is used to sense the temperature or pressure in the first chamber 311 and generate a corresponding signal. The battery management system is used to be electrically connected with the thermal runaway sensing element and the trigger member, and the battery management system can respond to the signal sent by the thermal runaway sensing element. When the signal exceeds the corresponding threshold value, that is, when the battery cell 32 is thermal-runaway, the battery management system can control the trigger member to trigger and activate the solid fire-fighting agent, so that a chemical reaction occurs to generate an inert gas. The situation that the signal exceeds the corresponding threshold may include that the temperature in the first chamber 311 exceeds the threshold, and may also include that the internal pressure of the first chamber 311 exceeds the threshold.

It should be noted that one or more communication ports 3104 may be provided in one second chamber 3101.

In some embodiments, when the second chamber 3101 is closed, when the fire-fighting agent contained in the second chamber 3101 is liquid fire-fighting agent, the height of the formed communication port 3104 should be lower than that of the level of the liquid fire-fighting agent in the second chamber 3101, so that after the second chamber 3101 is communicated with the first chamber 311, the liquid fire-fighting agent can quickly flow out through the communication port 3104.

Figure 11:
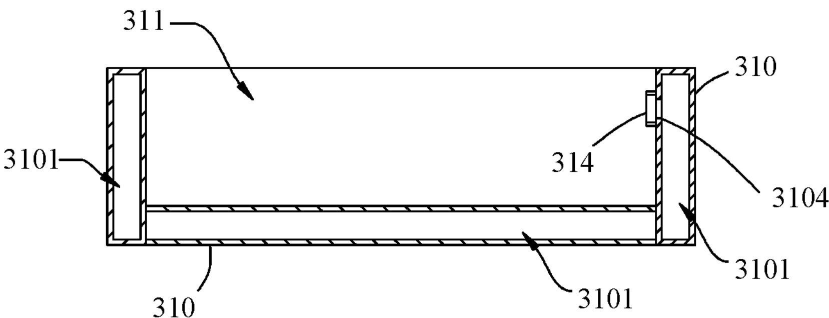
FIG. 11 is a schematic diagram of assembling an electric control valve and a box wall, provided by an embodiment of the present disclosure.

FIG. 11 shows a schematic diagram of the assembly of the electric control valve 314 and the box wall 310 provided by an embodiment of the present disclosure. In some embodiments of the present disclosure, as shown in FIG. 11, the box 31 further includes an electric control valve 314, the electric control valve 314 is installed on the box wall 310 and is used to close the communication port 3104, and the electric control valve 314 is configured to be opened when the battery cell 32 is thermal-runaway, so that the first chamber 311 and the second chamber 3101 are communicated with each other.

When the electronic control valve 314 closes the communication port 3104, the fire-fighting agent can be sealed in the second chamber 3101 under the increased pressure, or can be sealed in the second chamber 3101 under the normal pressure, and the electronic control valve 314 can prevent the fire-fighting agent from leaking from the second chamber 3101. When the electric control valve 314 closes the communication port 3104, the fire-fighting agent can be a gas fire-fighting agent, a liquid fire-fighting agent, or a solid fire-fighting agent. That the fire-fighting agent is packaged under increased pressure can be understood as the packaging under the pressure higher than the atmospheric pressure (or normal pressure).

Considering the controlling method of the electric control valve 314, the electric control valve 314 needs to be used in conjunction with the battery management system. When the battery cell 32 is thermal-runaway, the battery management system controls the electric control valve 314 to open, so that the first chamber 311 and the second chamber 3101 are communicated with each other, thereby releasing the fire-fighting medium into the first chamber 311. By using the electronic control valve 314 to control the opening or closing of the communication port 3104, the release of the fire-fighting medium can be precisely controlled.

In some embodiments, the electric control valve 314 can be a two-way electric control valve, and the electric control valve 314 can also be used as an injection valve. When the battery cell 32 is thermal-runaway, the electric control valve 314 can be opened to release the fire-fighting agent, or the electric control valve 314 can be used to inject the fire-fighting agent into the second chamber 3101, for reducing the cost.

Figure 12:
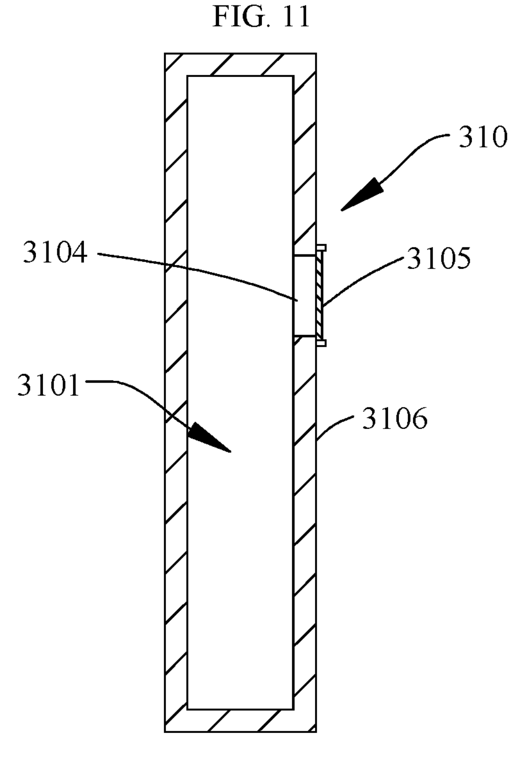
FIG. 12 is a schematic diagram of installing a weak member provided by an embodiment of the present disclosure.

FIG. 12 shows a schematic diagram of the installation of the weak member 3105 provided by an embodiment of the present disclosure. In some embodiments, as shown in FIG. 12, the box 31 further includes a weak member 3105, the weak member 3105 is used to close the communication port 3104, and the weak member 3105 is configured to be broken when the internal pressure of the second chamber 3101 reaches a third threshold value. The weak member 3105 closes the communication port 3104. When the battery cell 32 is thermal-runaway, the internal pressure of the second chamber 3101 can be increased to a third threshold to damage the weak member 3105, so that the fire-fighting medium can be quickly ejected through the communication port 3104, for rapidly extinguishing the fire.

The positional relationship between the weak member 3105 and the communication port 3104 can be in the way that the weak member 3105, as a whole, is located in the communication port 3104, and the weak member 3105 is connected to the inner wall of the communication port 3104; or the weak member 3105 as a whole is located outside the communication port 3104, and the weak member 3105 is connected to the outer surface of the box wall 310 or connected to the inner wall of the communication port 3104 through a connecting member.

In some embodiments, the weak member 3105 can be a thin sheet, which is of a simple structure and is easy to be broken.

Figure 13:
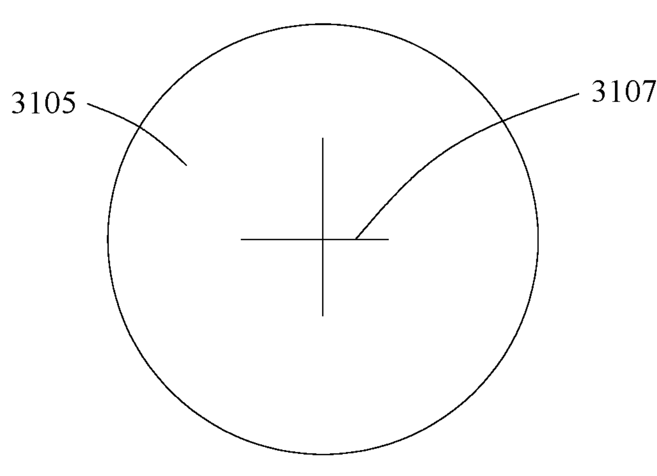
FIG. 13 is a schematic structural diagram of a weak member provided by an embodiment of the present disclosure.

FIG. 13 shows a schematic structural diagram of a weak member 3105 provided by an embodiment of the present disclosure. When the weak member 3105 is a thin sheet, in order to facilitate the breaking of the weak member 3105, the thickness of the weak member 3105 can be designed to be thinner. As shown in FIG. 13, when the weak member 3105 can be provided with nicks 3107, in which when in the original state or the received pressure not reaching the breaking condition of the nicks 3107, the weak member 3105 closes the communication port 3104. When the pressure received reaches the breaking condition of nicks 3107, that is, when the internal pressure of the second chamber 3101 increases to a third threshold value, the nicks 3107 are broken. When the pressure is increasing, the weak member 3105 is torn along the extending direction of the nick 3107, thereby forming an opening in the weak member 3105 with the opening unable of being closed.

Figure 14:
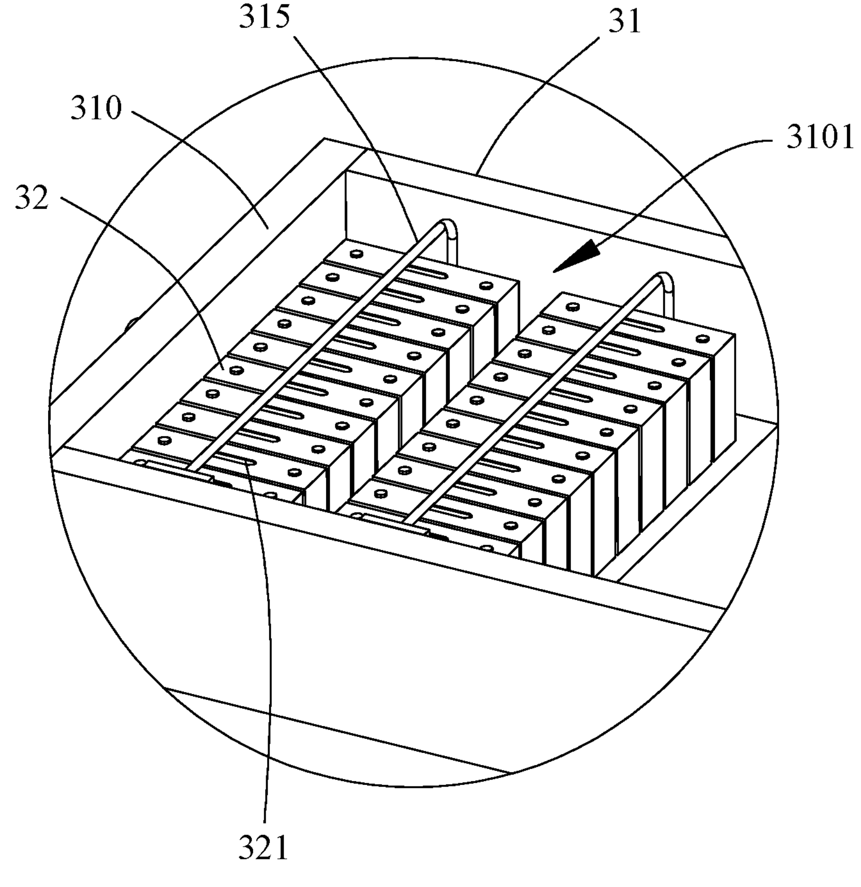
FIG. 14 is an enlarged view at A of FIG. 2.

FIG. 14 is an enlarged view of A of FIG. 2, showing a schematic diagram of a conduit 315 provided by an embodiment of the present disclosure. In some embodiments of the present disclosure, as shown in FIG. 14, the casing 31 further includes a conduit 315, the conduit 315 is located in the first chamber 311, and one end of the conduit 315 is configured to be connected with the casing 31, so that the inside of the conduit 315 can be communicated with the second chamber 3101 via the communication port 3104, when the battery cell 32 is thermal-runaway. At least part of the conduit 315 is configured to be broken by emissions generated by the thermal runaway of the battery cell 32. A third chamber 3152 is formed inside the conduit 315 to realize the diversion of the fire-fighting medium released from the second chamber 3101. When the conduit 315 is broken, the fire-fighting medium in the third chamber 3152 can enter the first chamber 311 through the broken part of the conduit 315. The conduit 315 can extend in any direction in the first chamber 311, and the extension path of the conduit 315 can cover a wide range and correspond to a plurality of battery cells 32. When the battery cell 32 is thermal-runaway, that is, when the first pressure-relief mechanism 321 is actuated, the emissions discharged from the first pressure-relief mechanism 321 can damage the part of the conduit 315 corresponding to the first pressure-relief mechanism 321, so that the fire-fighting medium flowing through the third chamber 3152 is released to the first chamber 311, and extinguishes a fire at a fixed spot for the battery cell 32 of thermal runaway.

In some embodiments of the present disclosure, the other end of the conduit 315 is closed, that is, the closed end. When the conduit 315 is broken, the fire-fighting medium in the third chamber 3152 can be collected at the broken part and leave the conduit 315.

In other embodiments of the present disclosure, the other end of the conduit 315 may also be an opening, that is, the end is an open end, and the third chamber 3152 is communicated with the first chamber 311, so that the fire-fighting medium can spread in the first chamber 311.

Figure 15:
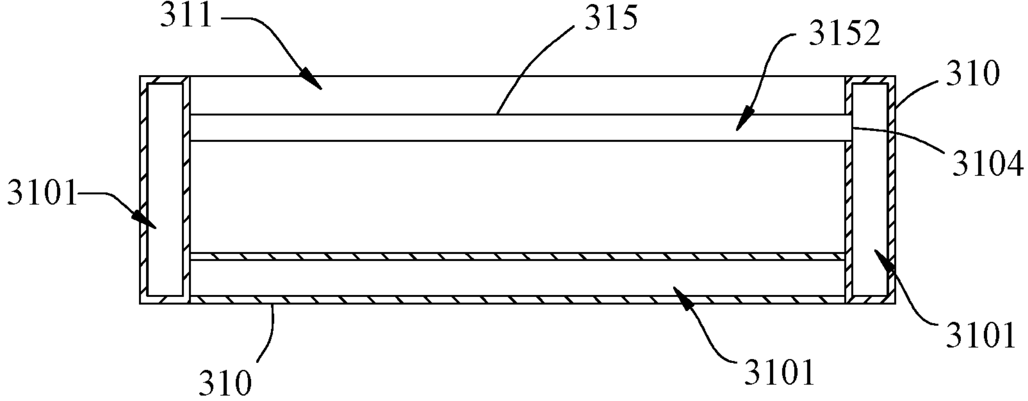
FIG. 15 is a schematic diagram of assembling a conduit and a box provided by an embodiment of the present disclosure.
Figure 16:
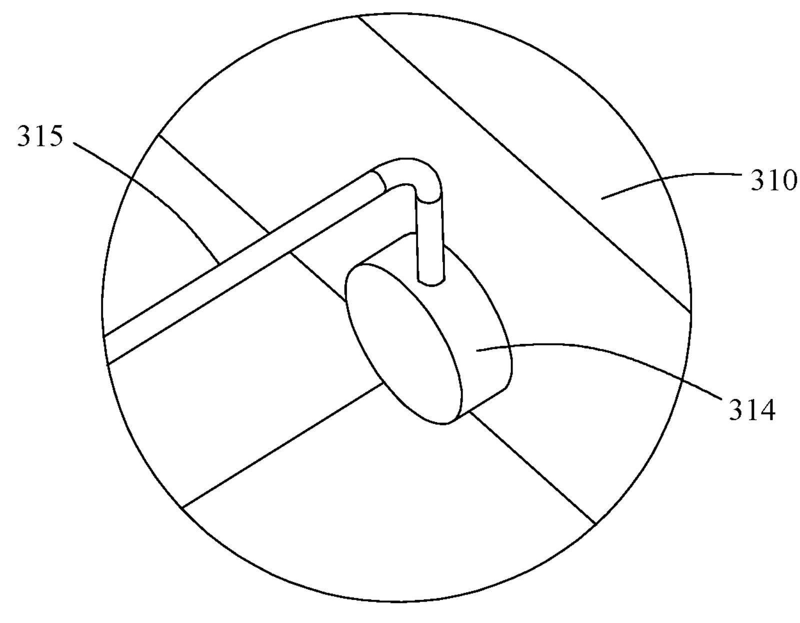
FIG. 16 is an enlarged view at B of FIG. 3.
Figure 17:
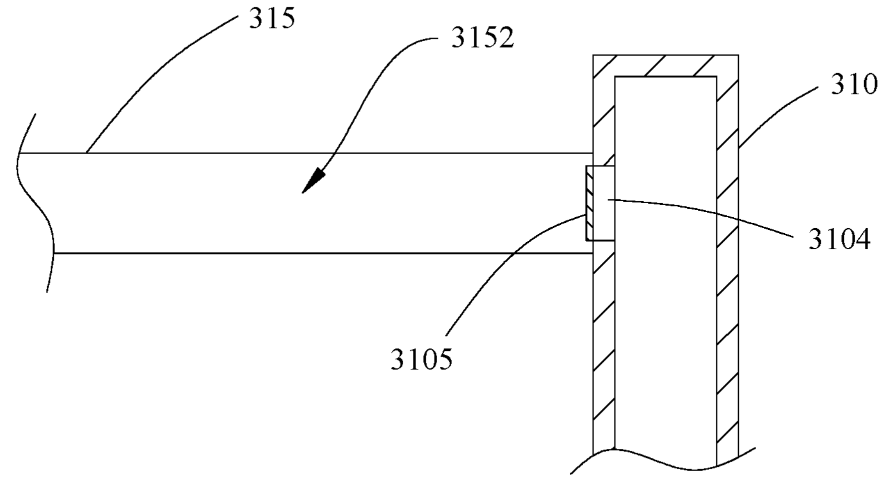
FIG. 17 is a schematic diagram of assembling a conduit and a weak member provided by an embodiment of the present disclosure.

FIG. 15 shows a schematic diagram of the assembly of the conduit 315 and the box 31 provided by an embodiment of the present disclosure. FIG. 16 is an enlarged view of B in FIG. 3, showing the schematic diagram of the assembly of the conduit 315 and the electric control valve 314 provided by an embodiment of the present disclosure; and FIG. 17 shows a schematic diagram of the assembly of the conduit 315 and the weak member 3105 provided by an embodiment of the present disclosure. It should be understood that one end of the conduit 315 can be directly connected to the box wall 310 of the box 31, such as, by welding, riveting or screwing, as shown in FIG. 15, and that is, one end of the conduit 315 is connected to the box wall 310 provided with the communication port 3104, and the third chamber 3152 is communicated with the communication port 3104. As shown in FIG. 16, one end of the conduit 315 may also be connected with the box 31 through an electronic control valve 314. The electric control valve 314 is installed in the box 31 and used to close the communication port 3104. When the battery cell 32 is thermal-runaway, the electronic control valve 314 is opened, so that the third chamber 3152 is communicated with the second chamber 3101 through the communication port 3104. As shown in FIG. 17, one end of the conduit 315 is connected to the box wall 310 provided with the communication port. The weak member 3105 closes the communication port, and the conduit 315 is sleeved outside the communication port 3104 and the weak member 3105. When the battery cell 32 is thermal-runaway, after the weak member 3105 is broken, the third chamber 3152 is communicated with the second chamber 3101.

In some embodiments, the other end (i.e., the closed end) of the conduit 315 is connected to the side wall 310*a* or the beam 310*c*. For example, the closed end of the conduit 315 can overlap or abut against the side wall 310*a* or the beam 310*c*. The closed end can be connected to the side wall 310*a* or the beam 310*c* through a bracket. Also, a hole corresponding to the conduit 315 (not shown in the drawings) can be formed on the side wall 310*a* or the beam 310*c*, and the closed end of the conduit 315 can be inserted into the hole. The embodiments of the present disclosure are not limited to this.

Figure 18:
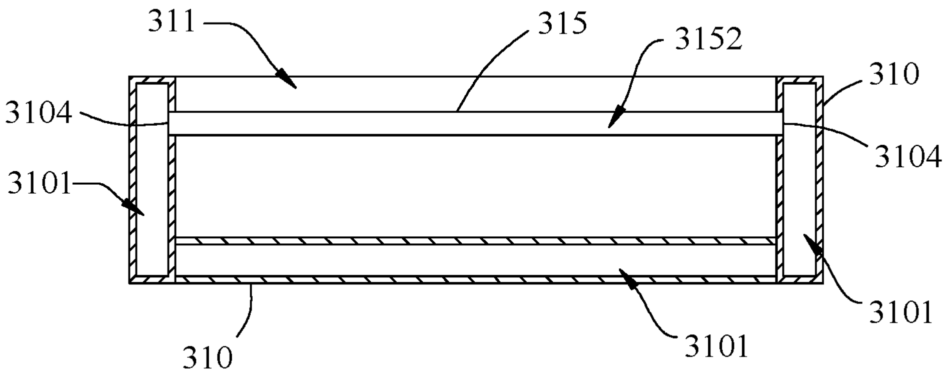
FIG. 18 is a schematic diagram of assembling a conduit and a box provided by another embodiment of the present disclosure.

FIG. 18 shows a schematic diagram of the assembly of the conduit 315 and the box 31 provided by another embodiment of the present disclosure. In other embodiments, as shown in FIG. 18, the box 31 further includes a conduit 315, the conduit 315 is located in the first chamber 311, and both ends of the conduit 315 can be respectively communicated with the second chamber 3101. For example, the two ends of the conduit 315 can be communicated with the second chamber 3101 through the two communication ports 3104. For example, the two ends of the conduit 315 can be communicated with the communication ports 3104 on the two box walls 310 opposite to each other, that is, the two box walls 310 share the conduit 315. For another example, both ends of the conduit 315 can be communicated with two communication ports 3104 on the same box wall 310. Two ends of the conduit 315 can also be communicated with the second chamber 3101 through a communication port 3104. For example, after one end of the conduit 315 is communicated with the communication port 3104, the middle part of the conduit 315 is bent in the first chamber 311, and the other end of the conduit 315 extends to communicate with the communication port 3104, and for example, the two ends of the conduit 315 form a shape of "8". At least a portion of the conduits 315 are configured to be broken by emissions from thermal runaway of the battery cells 32. Both ends of the conduit 315 are respectively communicated with the second chamber 3101, increasing the outlet of the second chamber 3101. After the conduit 315 is broken by the emissions generated by the thermal runaway of the battery cells 32, more fire-fighting medium can enter the first chamber 311 to quickly extinguish the fire. At the same time, since both ends of the conduit 315 are communicated with the second chamber 3101 respectively, the fire-fighting agent is filled in the conduit 315, and can rapidly extinguish the fire after the conduit 315 is broken.

Figure 19:
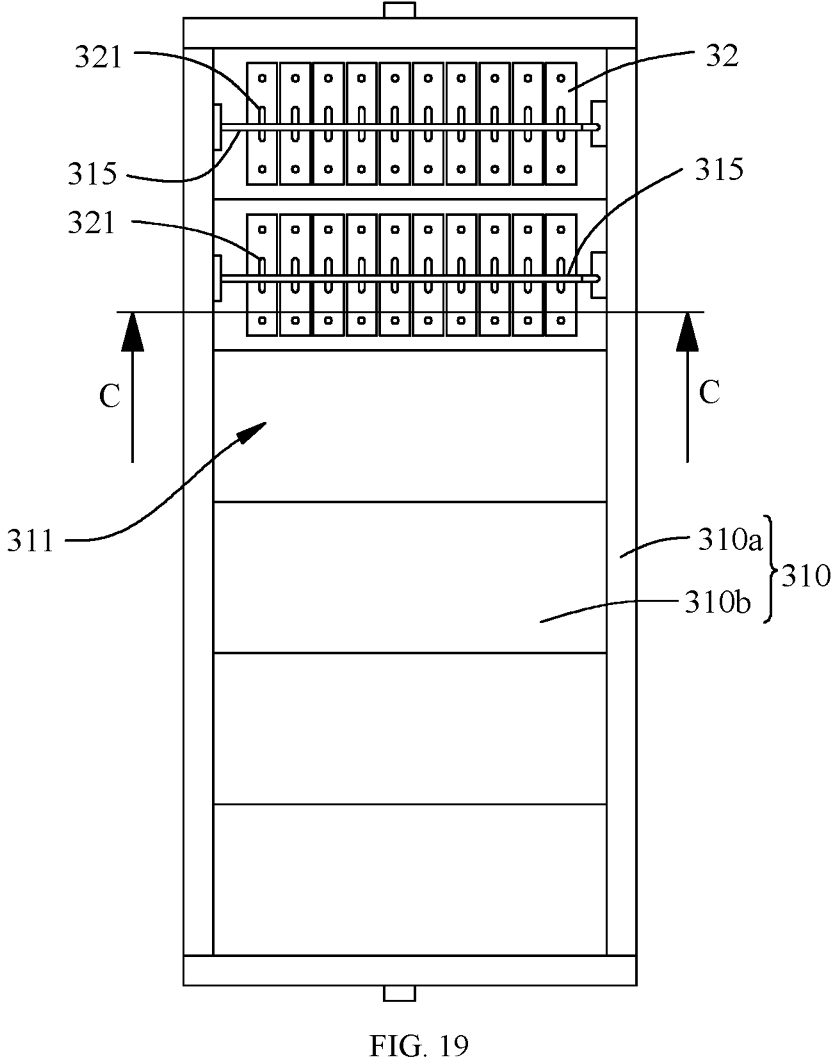
FIG. 19 is a top view of a battery provided by an embodiment of the present disclosure (with the cover hidden)

FIG. 19 shows a top view (with the cover hidden) of the battery 30 provided by an embodiment of the present disclosure. In order to facilitate the accurate extinguishing of fire, as shown in FIG. 19, at least part of the conduit 315 is disposed opposite to the first pressure-relief mechanism 321 of the battery cell 32, that is, the arranged path of the conduit 315 in the first chamber 311 passes through the first pressure-relief mechanism 321. The first pressure-relief mechanism 321 is actuated when the battery cell 32 is thermal-runaway, and the emissions from the battery cell 32 is discharged toward the conduit 315. The power and destructive force of these emissions cause the part of the conduit 315 corresponding to the first pressure-relief mechanism 321 to be destroyed, so that the interior of the conduit 315 is communicated with the first chamber 311, thereby making the fire-fighting medium flowing from the second chamber 3101 enter the first chamber 311 through the damaged part of the conduit 315. The fire-fighting medium can carry out the fixed-spot fire-Extinguishing for the first pressure-relief mechanism 321.

Figure 20:
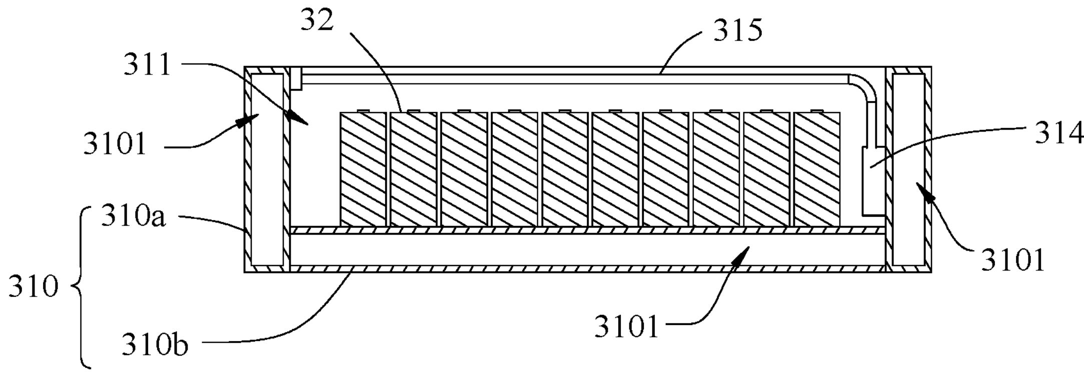
FIG. 20 is a sectional view along the CC direction of FIG. 19.

FIG. 20 is a cross-sectional view along the CC direction of FIG. 19, showing a schematic layout view of the conduit 315 and the battery cell 32 provided by an embodiment of the present disclosure. The layout position of the conduit 315 and the battery cell 32 can be determined according to the position of the first pressure-relief mechanism 321 of the battery cell 32. For example, as shown in FIG. 19 and FIG. 20, the battery cell 32 is placed on the bottom wall 310*b*, the first pressure-relief mechanism 321 is located at the top of the battery cell 32, and then the conduit 315 is located above the battery cell 32, and there is a certain height difference between the conduit 315 and the battery cell 32 to ensure that after the conduit 315 is broken, the fire-fighting medium can be quickly ejected onto the first pressure-relief mechanism 321, so as to avoid the spread of the fire-fighting medium from being affected by the too small distance between the conduit 315 and the first pressure-relief mechanism 321, thereby affecting the fire-extinguishing effect.

Figure 21:
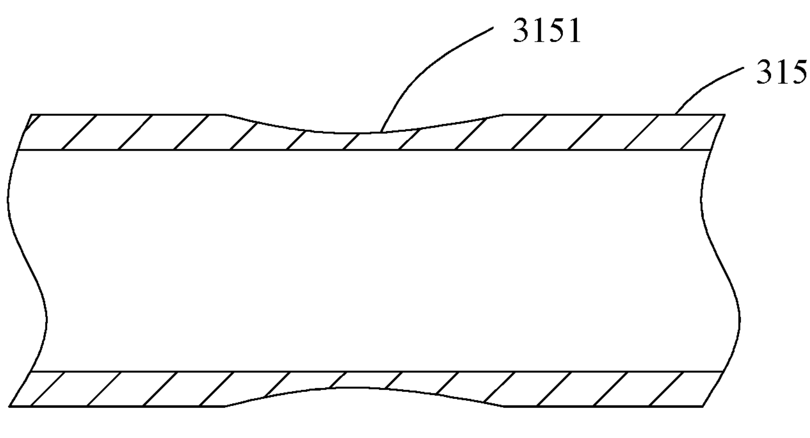
FIG. 21 is a schematic diagram of a weak part provided by an embodiment of the present disclosure.
Figure 22:
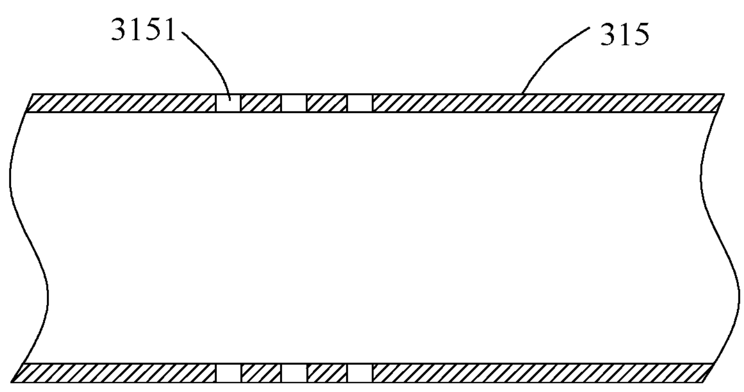
FIG. 22 is a schematic diagram of a weak part provided by another embodiment of the present disclosure.

FIG. 21 shows a schematic diagram of a weak part 3151 provided by an embodiment of the present disclosure, and FIG. 22 shows a schematic diagram of a weak part 3151 provided by another embodiment of the present disclosure. In some embodiments, as shown in FIGS. 21 and 22, the conduit 315 includes a weak part 3151, the weak part 3151 is disposed opposite the first pressure-relief mechanism 321, and the weak part 3151 is configured to be capable of being broken by emissions generated by the thermal runaway of the battery cells 32.

Since the weak part 3151 is easily broken, when the battery cell 32 is thermal-runaway, the emissions discharged from the first pressure-relief mechanism 321 can quickly damage the conduit 315, so that the fire-fighting medium can be quickly ejected toward the first pressure-relief mechanism 321.

In some embodiments, as shown in FIG. 21, the weak part 3151 may be a region with a thinner wall thickness, that is, the wall thickness of the weak part 3151 is thinner relatively to other regions of the conduit 315. The weak portion 3151 can be breached by the fire-fighting medium when the pressure in the conduit 315 reaches a threshold at which the weak portion 3151 is broken. When the battery cell 32 is thermal-runaway and the internal pressure of the second chamber 3101 is greater than the internal pressure of the first chamber 311, the high-pressure fire-fighting medium can break through the weak part 3151 when passing through the weak part 3151 of the conduit 315, so that the first chamber 311 is communicated with the second chamber 3101. At this time, the high-pressure fire-fighting medium is rapidly ejected toward the first pressure-relief mechanism 321, to achieve the fixed-point fire extinguishing.

In addition, as shown in FIG. 22, the weak part 3151 may be a through hole, so that the conduit 315 is easily broken when the emissions from the battery cell 32 acts on the weak part 3151.

In some embodiments, the conduit 315 includes a hot-melt part disposed opposite the first pressure-relief mechanism 321, and the hot-melt part is configured to be capable of being broken by the hot melt or by emissions, when the battery cell 32 is thermal-runaway. Since the hot-melt part has a relatively low melting point, when the battery cell 32 is thermal-runaway, the emissions from the first pressure-relief mechanism 321 are discharged to the hot-melt part to damage the hot-melt part. Here, that the emissions damage the hot-melt part can include: the hot-melt part is thermally melted by the emissions, and the hot-melt part is broken by the emissions. The hot-melt part can be a low melting point metal film, such as, aluminum foil, tin foil, etc., and it can also be a plastic, such as, PP, PE, PVC (Polyvinyl chloride), etc. The hot-melt part is configured in such a way that the fire-fighting medium can extinguish the fire for the first pressure-relief mechanism 321 at a fixed spot, after the hot-melt part is broken, thereby improving the fire-extinguishing efficiency.

In some embodiments, at least part of the conduit 315 is a hot-melt part, and the portion of the conduit 315 corresponding to the first pressure-relief mechanism 321 may be a hot-melt part, or the entirety of the conduit 315 may be a hot-melt part, which is depending on the conduits 315 of different structures used in the actual situation.

Figure 23:
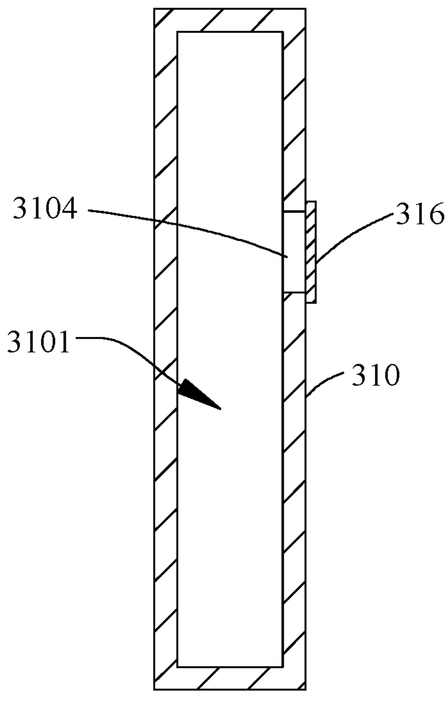
FIG. 23 is a schematic diagram of the assembly of a hot-melt part and a box provided by an embodiment of the present disclosure.

FIG. 23 shows a schematic diagram of the assembly of the hot-melt member 316 and the box 31 according to an embodiment of the present disclosure. In some embodiments, as shown in FIG. 23, the box 31 further includes a hot-melt member 316. The hot-melt member 316 is used to close the communication port 3104. The melting point of the hot-melt member 316 may be lower than that of the box wall 310. The hot-melt member 316 is fixed to the box wall 310. For example, the hot-melt member 316 can be welded to the box wall 310, and the hot-melt member 316 can be fixed to the box wall 310 through other connecting members. The hot-melt member 316 is configured to be hot-melted when the battery cell 32 is thermal-runaway, so that the first chamber 311 and the second chamber 3101 are communicated. The hot-melt member 316 closes the communication port 3104, which can block the fire-fighting agent and prevent the fire-fighting agent from leaking from the second chamber 3101. At the same time, the hot-melt member 316 can also ensure that when the second chamber 3101 and the first chamber 311 are not in communication, the internal pressure of the second chamber 3101 is greater than the internal pressure of the first chamber 311. When the battery cell 32 is thermal-runaway, due to the relatively low melting point of the hot-melt member 316, the hot-melt member 316 is easily hot-melted, so that the first chamber 311 is communicated with the second chamber 3101, so as to quickly release the fire-fighting medium, with the response speed quick The positional relationship between the hot-melt member 316 and the communication port 3104 can be set in the way that the hot-melt member 316 as a whole is located in the communication port 3104, and the hot-melt member 316 is connected to the inner wall of the communication port 3104; or it is possible that the hot-melt member 316 as a whole is located outside the communication port 3104, and the hot-melt member 316 is connected with the outer surface of the box wall 310 or connected with the inner wall of the communication port 3104 through a connecting member.

In some embodiments, the hot-melt member 316 may be a fusible film, in which when the temperature is higher than 300° C., the fusible film is melted to release the fire-fighting medium.

Figure 24:
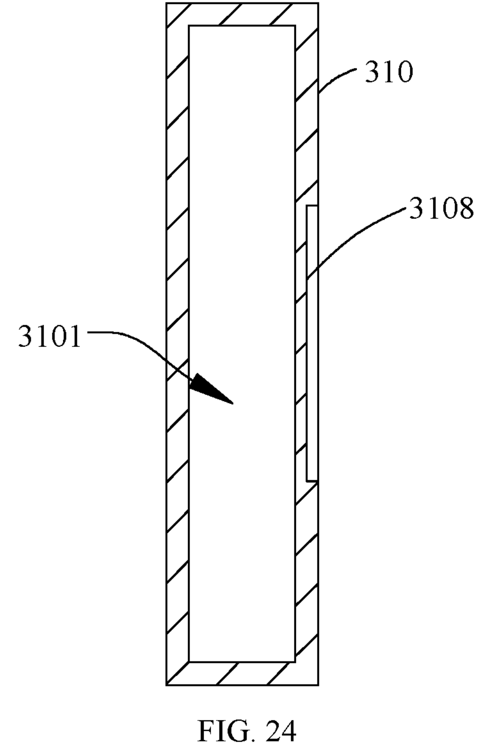
FIG. 24 is a schematic diagram of a weak zone of a box wall provided by an embodiment of the present disclosure.

FIG. 24 shows a schematic diagram of the weak zone 3108 of the box wall 310 provided by an embodiment of the present disclosure. In some embodiments, as shown in FIG. 24, the box wall 310 is provided with a weak zone 3108 that is configured to be broken when the pressure within the second chamber 3101 reaches a third threshold, so that the first chamber 311 communicates with the second chamber 3101. The weak zone 3108 can be understood as a groove which is formed in a partial area of the box wall 310, so that this partial area is weaker than other areas. When the pressure in the second chamber 3101 increases to the third threshold, the weak zone 3108 is easily broken, thereby enabling the fire-fighting medium to enter the first chamber 311 via the location of the broken weak zone 3108. By setting weak zones 3108 in different areas of the box wall 310, it can quickly respond to the thermal runaway of the battery cell 32 at different positions.

It should be understood that the area and length of the weak zone 3108 may be set according to actual conditions, and the weak zone 3108 may correspond to a plurality of battery cells 32 to facilitate the rapid response. The weak zone 3108 is located on the surface of the box wall 310 facing the first chamber 311, for example, the weak zone 3108 may be the area of the surface opposite to the first pressure-relief mechanism 321, or the weak zone 3108 may cover the entire surface.

An embodiment of the present disclosure also provides an electrical device, and the electrical device may include the battery 30 in the foregoing embodiments. In some embodiments, the electrical device may be a vehicle 1, a ship or a spacecraft.

The box 31, the battery 30 and the electrical device of the embodiments of the present disclosure are described above, and the method for manufacturing the battery 30 of the embodiments of the present disclosure will be described below. The foregoing embodiments may be referred to, for learning the parts not described in detail.

Figure 25:
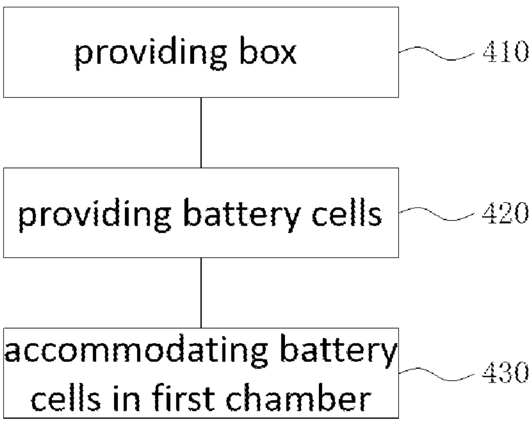
FIG. 25 is a schematic flowchart of a method for manufacturing a battery according to an embodiment of the present disclosure.

FIG. 25 shows a schematic flowchart of a method for manufacturing the battery 30 according to embodiments of the present disclosure. As shown in FIG. 25, the method may include:

- step 410 of providing a box 31, in which the box 31 includes a plurality of box walls 310, the plurality of box walls 310 enclose a first chamber 311, at least one box wall 310 is provided therein with a second chamber 3101, and the second chamber 3101 accommodates the fire-fighting agent;
- step 420, of providing one or more battery cells 32;

step 430 of accommodating the one or more battery cells 32 in the first chamber 311, in which the first chamber 311 and the second chamber 3101 are configured to be able to communicate with each other when at least one of the battery cells 32 is thermal-runaway, so that the fire-fighting agent releases the fire-fighting medium into the first chamber 311.

In some embodiments, the step "410" includes a step of "providing a box 31, in which the box 31 includes a plurality of box walls 310, the plurality of box walls 310 enclose a first chamber 311, at least one box wall 310 is provided therein with a second chamber 3101, and the second chamber 3101 accommodates the fire-fighting agent", which can be understood as two situations. In one situation, the fire-fighting agent is placed in the second chamber 3101 when the box 31 is manufactured; and in another situation, the box 31 is first manufactured, and the fire-fighting agent is placed in the second chamber 3101 of the box wall 310 when the battery 30 is manufactured.

Finally, it should be noted that the above embodiments are only used to illustrate the technical solutions of the present disclosure, but not to limit them. Although the present disclosure has been described in detail with reference to the foregoing embodiments, those skilled in the art should understand it is still possible that technical solutions described in the foregoing embodiments are modified, or some technical features thereof are equivalently replaced, but these modifications or replacements do not make the essence of the corresponding technical solutions deviate from the spirit and scope of the technical solutions of the embodiments of the present disclosure.

What is claimed is:

1. A box, applicable to a battery, the battery comprising a battery cell, wherein the box comprises:

a plurality of box walls, wherein the plurality of box walls enclose a first chamber for accommodating the battery cell, and at least one of the box walls is internally provided with a second chamber for accommodating fire-fighting agent, the plurality of box walls are provided with a communication port for allowing the first chamber to be communicated with the second chamber, a conduit located in the first chamber and having two ends, at least one of the two ends is connected with the box, an inside of the conduit is communicated with the second chamber through the communication port when the battery cell is thermal-runaway, at least a portion of the conduit is configured to be broken by emissions produced by thermal runaway of the battery cell, a weak member configured for closing the communication port, wherein the conduit is sleeved outside the communication port and the weak member, the weak member is configured to be broken when a pressure of the second chamber reaches a third threshold, so that the first chamber and the second chamber is communicated with each other, wherein the first chamber and the second chamber are configured to communicate with each other when the battery cell is thermal-runaway to enable the fire-fighting agent to release fire-fighting medium into the first chamber.

2. The box according to claim 1, wherein when the first chamber and the second chamber are not in communication, an internal pressure of the second chamber is greater than that of the first chamber.

3. The box according to claim 1, wherein the box further comprises:

an electric control valve, for closing the communication port, the electric control valve is configured to open when the battery cell is thermal-runaway, so as to make the first chamber communicated with the second chamber.

4. The box according to claim 1, wherein the other end of the conduit is closed.

5. The box according to claim 1, wherein, both the two ends of the conduit are respectively connected to the box and in communication with the second chamber.

6. The box according to claim 1, wherein the battery cell comprises a first pressure-relief mechanism, wherein the first pressure-relief mechanism is configured to actuate to release pressure when an internal pressure of the battery cell reaches a first threshold or a temperature of the battery cell reaches a second threshold; and at least a portion of the conduit is disposed opposite the first pressure-relief mechanism.

7. The box according to claim 6, wherein the conduit comprises a weak part which is disposed opposite the first pressure-relief mechanism, and the weak part is configured to be capable of being broken by the emissions produced by the thermal runaway of the battery cell.

8. The box according to claim 6, wherein the conduit comprises a hot-melt part, which is disposed opposite the first pressure-relief mechanism, and the hot-melt part is configured to be able of being thermally melted or broken by the emissions when the battery cell is thermal-runaway.

9. The box according to claim 1, wherein the box further comprises:

a hot-melt member, configured for closing the communication port, wherein the hot-melt member is configured to be able to be thermally melted when the battery cell is thermal-runaway, so that the first chamber and the second chamber are communicated with each other.

10. The box according to claim 1, wherein each of the box walls is provided with a weak zone, which is configured to be able of being broken when a pressure in the second chamber reaches a third threshold, so that the first chamber is communicated with the second chamber.

11. The box according to claim 1, wherein the fire-fighting medium comprises a gas fire-fighting medium.

12. The box according to claim 1, wherein the first chamber has an exhaust port, and the fire-fighting medium and the emissions generated by thermal runaway of the battery cell, after being mixed in the first chamber, can be discharged out of the box through the exhaust port.

13. The box according to claim 12, wherein the box further comprises a second pressure-relief mechanism, the second pressure-relief mechanism is provided at the exhaust port, and the second pressure-relief mechanism is configured to be actuated to relieve pressure when a pressure within the first chamber reaches a fourth threshold or a temperature within the first chamber reaches a fifth threshold.

14. The box according to claim 1, wherein the box further comprises:

a trigger member, arranged in the second chamber and configured for triggering the fire-fighting agent to generate the fire-fighting medium when the battery cell is thermal-runaway.

15. The box according to claim 1, wherein each of the box walls is provided with an injection port communicating with the second chamber, and the injection port is configured to inject into the second chamber the fire-fighting agent.

16. The box according to claim 1, wherein the weak member comprises a thin sheet configured to close the communication port, the weak member being provided with at least one nick, wherein when pressure received by the weak member does not reach a breaking condition of the nick, the weak member closes the communication port, and when an internal pressure of the second chamber increases to a third threshold value such that the breaking condition of the nick is reached, the nick is broken and the weak member is torn along an extending direction of the nick to form an opening in the weak member that is unable to be closed.

17. The box according to claim 1, wherein the weak member is located as a whole in the communication port and is connected to an inner wall of the communication port so as to close the communication port.

18. The box according to claim 1, wherein the weak member is located as a whole outside the communication port and is connected to an outer surface of the box wall or connected to an inner wall of the communication port through a connecting member so as to close the communication port.

19. A battery, comprising:

a battery cell;

the box according to claim 1, wherein the battery cell is accommodated in the first chamber.

20. An electrical device, comprising the battery according to claim 19.

* * * * *